US012696078B2

(12) United States Patent
Wirth et al.

(10) Patent No.: US 12,696,078 B2
(45) Date of Patent: Jul. 28, 2026

(54) UE CAPABILITY REPORTING AND HANDLING OF ARTIFICIAL INTELLIGENCE/MACHINE LEARNING MODELS

(71) Applicant: Fraunhofer-Gesellschaft zur Förderung der angewandten Forschung e.V., Munich (DE)

(72) Inventors: Thomas Wirth, Berlin (DE); Cornelius Hellge, Berlin (DE); Tatiana Rykov, Berlin (DE); Thomas Fehrenbach, Berlin (DE); Baris Göktepe, Berlin (DE); Thomas Schierl, Berlin (DE); Thomas Wiegand, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 19/387,326

(22) Filed: Nov. 12, 2025

(65) Prior Publication Data

US 2026/0075408 A1     Mar. 12, 2026

Related U.S. Application Data

(63) Continuation of application No. PCT/EP2024/062632, filed on May 7, 2024.

(30) Foreign Application Priority Data

May 12, 2023     (EP) .................................... 23173214

(51) Int. Cl.
*H04W 8/24*          (2009.01)
*H04W 24/02*        (2009.01)

(52) U.S. Cl.
CPC ............. *H04W 8/24* (2013.01); *H04W 24/02* (2013.01)

(58) Field of Classification Search
CPC ............................... H04W 8/24; H04W 24/02
See application file for complete search history.

(56) References Cited

U.S. PATENT DOCUMENTS

2019/0313239 A1* 10/2019 Horn ........................ H04W 8/20
2021/0400765 A1* 12/2021 Bedekar ................ H04W 76/27
(Continued)

FOREIGN PATENT DOCUMENTS

CN          117835262 A  *  4/2024  ............. H04L 41/16
WO        2022205023 A1  10/2022
(Continued)

OTHER PUBLICATIONS

International Search Report and Written Opinion in International Application No. PCT/EP2024/062632, mailed Nov. 10, 2024, 24 pages.

(Continued)

*Primary Examiner* — Sujoy K Kundu
*Assistant Examiner* — Vladislav Y Agureyev
(74) *Attorney, Agent, or Firm* — ARENTFOX SCHIFF LLP

(57)          ABSTRACT

A user device, UE, for a wireless communication network, like a 3$^{rd}$ Generation Partnership Project, 3GPP, network, is described. The UE has a plurality of UE capabilities, the UE capabilities indicating functions the UE is capable to perform. The UE is to inform on one or more parts of the plurality of UE capabilities using one or more identification values, e.g., hash values.

16 Claims, 9 Drawing Sheets

(56)  References Cited

U.S. PATENT DOCUMENTS

| | | | |
|---|---|---|---|
| 2022/0007176 A1* | 1/2022 | Lindheimer | H04L 9/3239 |
| 2022/0124658 A1* | 4/2022 | Beale | H04W 56/0045 |
| 2022/0174503 A1* | 6/2022 | Kounev | G06V 10/70 |
| 2022/0342713 A1* | 10/2022 | Shen | G06F 9/5094 |
| 2022/0394683 A1* | 12/2022 | Palenius | H04W 48/08 |
| 2023/0093963 A1* | 3/2023 | Kumar | H04L 41/16 |
| | | | 370/252 |
| 2023/0254719 A1* | 8/2023 | Kim | H04L 41/16 |
| | | | 370/252 |
| 2023/0262706 A1* | 8/2023 | Li | H04W 72/51 |
| | | | 370/329 |
| 2023/0269606 A1* | 8/2023 | Säily | H04W 24/02 |
| | | | 455/67.11 |
| 2023/0337043 A1* | 10/2023 | Pateromichelakis | |
| | | | H04W 28/0263 |
| 2023/0370879 A1* | 11/2023 | Chou | H04W 24/08 |
| 2023/0396496 A1* | 12/2023 | Gabin | H04W 24/02 |
| 2024/0073109 A1* | 2/2024 | Vaishnavi | H04L 41/5058 |
| 2024/0267799 A1* | 8/2024 | Pan | H04W 36/22 |
| 2024/0267800 A1* | 8/2024 | Pan | G06N 20/00 |
| 2024/0281708 A1* | 8/2024 | Gold | H04W 24/02 |
| 2025/0030612 A1* | 1/2025 | Guan | H04W 24/02 |
| 2025/0048085 A1* | 2/2025 | Wang | G06N 3/045 |
| 2025/0048136 A1* | 2/2025 | Moosavi | H04L 67/12 |
| 2025/0184233 A1* | 6/2025 | Garcia Martin | H04L 41/147 |
| 2025/0202556 A1* | 6/2025 | Mu | H04W 8/22 |
| 2025/0227507 A1* | 7/2025 | Yang | H04L 41/16 |
| 2025/0293943 A1* | 9/2025 | Kela | H04L 41/16 |
| 2025/0300900 A1* | 9/2025 | Shah | G01S 5/0273 |
| 2025/0373507 A1* | 12/2025 | Gu | G06N 3/0455 |

FOREIGN PATENT DOCUMENTS

| | | | | | |
|---|---|---|---|---|---|
| WO | 2022227959 A1 | 11/2022 | | | |
| WO | 2023272718 A1 | 1/2023 | | | |
| WO | WO-2024088571 A1 * | 5/2024 | | H04L 41/14 |
| WO | WO-2024207394 A1 * | 10/2024 | | G06N 20/00 |

OTHER PUBLICATIONS

"3rd Generation Partnership Project; Technical Specification Group Radio Access Network; Evolved Universal Terrestrial Radio Access (E UTRA); User Equipment (UE) radio access capabilities (Release 17)", 3GPP TS 36.306, V17.4.0, Mar. 2023, pp. 1-154.

"3rd Generation Partnership Project; Technical Specification Group Radio Access Network; NR; Radio Resource Control (RRC) protocol specification, (Release 17)", 3GPP TS 38.331, V17.4.0, Mar. 2023, pp. 1-1324.

"3rd Generation Partnership Project; Technical Specification Group Radio Access Network; NR; User Equipment (UE) radio access capabilities (Release 15)", 3GPP TS 38.306, V15.5.0, Mar. 2019, pp. 1-49.

"3rd Generation Partnership Project; Technical Specification Group Radio Access Network; NR; User Equipment (UE) radio access capabilities (Release 17)", 3GPP TS 38.306, V17.4.0, Mar. 2023, pp. 1-255.

Anonymous, "3rd Generation Partnership Project; Technical Specification Group Services and System Aspects; Study on optimisations on UE radio capability signalling (Release 16)", 3GPP TR 23.743, V16.0.0, Mar. 2019, pp. 1-56.

* cited by examiner

| definitions for parameters | per | M | FDD-TDD DIFF | FR1-FR2 DIFF |
|---|---|---|---|---|
| *IntraAndInterF-MeasAndReport*<br>Indicates wether the UE supports NR intra-frequency and inter-frequency measurements and at least periodical reporting. This field only applies to SN configured measurement when EN-DC is configured. For NR SA, this feature is mandatory supported. | UE | yes | yes | no |
| *periodicEUTRA-MeasAndReport*<br>Indicates wheter the UE supports periodic EUTRA measurement and reporting. It is mandatory if the UE supports EUTRA, otherwise optional. | UE | CY | no | no |
| maxNumberCSI-RS-RRM-RS-SINR<br>Defines the maximum number of CSI-RS resources from RRM and RS-SINR measurement across all measurement frequencies per slot. IF UE supports any of csi-RSRP-AndRSRQ-MeasWithSSB, csi-RSRP-AndRSRQ-MeasWithoutSSB, and csi-SINR-Meas, UE shall report this capability. | UE | CY | no | no |
| maxNumberResource-CSI-RS-RLM<br>Defines the maximum number of CSI-RS resources within a slot per spCell for CSI-RS based RLM. IF UE supports any of csi-RS-RLM and ssb-AndCSI-RS-RLM, UE shall report this capability. | UE | CY | no | yes |

Fig. 3

UE CAPABILITY REPORTING AND HANDLING OF ARTIFICIAL INTELLIGENCE/MACHINE LEARNING MODELS

CROSS-REFERENCE TO RELATED APPLICATIONS

This application is a continuation of copending International Application No. PCT/EP2024/062632, filed May 7, 2024, which is incorporated herein by reference in its entirety, and additionally claims priority to European Application No. 23173214.0, filed May 12, 2023, which is also incorporated herein by reference in its entirety.

TECHNICAL FIELD

The present invention concerns the field of wireless communication systems or networks, more specifically to a user device, UE, capability report by which a UE may inform the wireless communication network on details of the UE's capabilities, as well as to the use of artificial intelligence/machine learning, AI/ML, models for implementing functions performed by a UE. Embodiments concern improvements of the UE capability reporting. Further embodiments concern the handing of AI/ML, models implemented in a UE.

BACKGROUND OF THE INVENTION

FIG. 1 is a schematic representation of an example of a terrestrial wireless network 100 including, as is shown in FIG. 1(A), the core network 102 and one or more radio access networks $RAN_1$, $RAN_2$, . . . $RAN_N$. FIG. 1(B) is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. The term base station may refer to an access point, AP, in any of the WiFi standards, e.g., belonging to the IEEE 802.11-family. A user may be a stationary device or a mobile device. The wireless communication system may also be accessed by mobile or stationary IoT devices which connect to a base station or to a user. The mobile or stationary devices may include physical devices, ground based vehicles, such as robots or cars, aerial vehicles, such as manned or unmanned aerial vehicles, UAVs, the latter also referred to as drones, buildings and other items or devices having embedded therein electronics, software, sensors, actuators, or the like as well as network connectivity that enables these devices to collect and exchange data across an existing network infrastructure. FIG. 1(B) shows an exemplary view of five cells, however, the $RAN_n$ may include more or less such cells, and $RAN_n$ may also include only one base station. FIG. 1(B) shows two users $UE_1$ and $UE_2$, also referred to as user device or user equipment, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(B) shows two further devices $110_1$ and $110_2$ in cell $106_4$, like IoT devices, which may be stationary or mobile devices. The device $110_1$ accesses the wireless communication system via the base station $gNB_4$ to receive and transmit data as schematically represented by arrow $112_1$. The device $110_2$ accesses the wireless communication system via the user $UE_3$ as is schematically represented by arrow $112_2$. The respective base station $gNB_1$ to $gNB_5$ may be connected to the core network 102, e.g., via the S1 interface, via respective backhaul links $114_1$ to $114_5$, which are schematically represented in FIG. 1(B) by the arrows pointing to "core". The core network 102 may be connected to one or more external networks. The external network may be the Internet, or a private network, such as an Intranet or any other type of campus networks, e.g., a private WiFi communication system or a 4G or 5G mobile communication system. Further, some or all of the respective base station $gNB_1$ to $gNB_5$ may be connected, e.g., via the S1 or X2 interface or the XN interface in NR, with each other via respective backhaul links $116_1$ to $116_5$, which are schematically represented in FIG. 1(B) by the arrows pointing to "gNBs". A sidelink channel allows direct communication between UEs, also referred to as device-to-device, D2D, communication. The sidelink interface in 3GPP is named PC5. Note, that the term user equipment, UE, or user device may also refer to a station, STA, as used in any of the WiFi standards, e.g., belonging to the IEEE 802.11-family.

For data transmission a physical resource grid may be used. The physical resource grid may comprise a set of resource elements to which various physical channels and physical signals are mapped. For example, the physical channels may include the physical downlink, uplink and sidelink shared channels, PDSCH, PUSCH, PSSCH, carrying user specific data, also referred to as downlink, uplink and sidelink payload data, the physical broadcast channel, PBCH, and the physical sidelink broadcast channel, PSBCH, carrying for example a master information block, MIB, and one or more system information blocks, SIBs, one or more sidelink information blocks, SLIBs, if supported, the physical downlink, uplink and sidelink control channels, PDCCH, PUCCH, PSSCH, carrying for example the downlink control information, DCI, the uplink control information, UCI, and the sidelink control information, SCI, and physical sidelink feedback channels, PSFCH, carrying PC5 feedback responses. The sidelink interface may support a 2-stage SCI which refers to a first control region containing some parts of the SCI, also referred to as the $1^{st}$-stage SCI, and optionally, a second control region which contains a second part of control information, also referred to as the $2^{nd}$-stage SCI.

For the uplink, the physical channels may further include the physical random-access channel, PRACH or RACH, used by UEs for accessing the network once a UE synchronized and obtained the MIB and SIB. The physical signals may comprise reference signals or symbols, RS, synchronization signals and the like. The resource grid may comprise a frame or radio frame having a certain duration in the time domain and having a given bandwidth in the frequency domain. The frame may have a certain number of subframes of a predefined length, e.g., 1 ms. Each subframe may include one or more slots of 12 or 14 OFDM symbols depending on the cyclic prefix, CP, length. A frame may also have a smaller number of OFDM symbols, e.g., when utilizing shortened transmission time intervals, sTTI, or a mini-slot/non-slot-based frame structure comprising just a few OFDM symbols.

The wireless communication system may be any single-tone or multicarrier system using frequency-division multiplexing, like the orthogonal frequency-division multiplexing, OFDM, system, the orthogonal frequency-division multiple access, OFDMA, system, or any other Inverse Fast Fourier Transform, IFFT, based signal with or without Cyclic Prefix, CP, e.g., Discrete Fourier Transform-spread-OFDM, DFT-s-OFDM. Other waveforms, like non-orthogonal waveforms for multiple access, e.g., filter-bank multi-carrier, FBMC, generalized frequency division multiplexing, GFDM, or universal filtered multi carrier, UFMC, may be used. The wireless communication system may operate, e.g., in accordance with 3GPPs LTE, LTE-Advanced, LTE-Advanced Pro, or the 5G or 5G-Advanced or 3GPPs NR, New Radio, or within LTE-U, LTE Unlicensed or NR-U, New Radio Unlicensed, which is specified within the LTE and within NR specifications.

The wireless network or communication system depicted in FIG. 1 may be a heterogeneous network having distinct overlaid networks, e.g., a network of macro cells with each macro cell including a macro base station, like base station gNB₁ to gNB₅, and a network of small cell base stations, not shown in FIG. 1, like femto or pico base stations. In addition to the above-described terrestrial wireless network also non-terrestrial wireless communication networks, NTN, exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro or 5G or 5G_Advanced or NR, New Radio, or a possible future 6G radio system.

In mobile communication networks, for example in a network like that described above with reference to FIG. 1, like a LTE or 5G/NR network, there may be UEs that communicate directly with each other over one or more sidelink, SL, channels, e.g., using the PC5/PC3 interface or WiFi direct. UEs that communicate directly with each other over the sidelink may include vehicles communicating directly with other vehicles, V2V communication, vehicles communicating with other entities of the wireless communication network, V2X communication, for example road-side units, RSUs, roadside entities, like traffic lights, traffic signs, or pedestrians. An RSU may have a functionality of a BS or of a UE, depending on the specific network configuration. Other UEs may not be vehicular related UEs and may comprise any of the above-mentioned devices. Such devices may also communicate directly with each other, D2D communication, using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are necessarily outside one of the cells depicted in FIG. 1, rather, it means that these UEs may not be connected to a base station, for example, they are not in an RRC connected state, so that the UEs do not receive from the base station any sidelink resource allocation configuration or assistance, and/or may be connected to the base station, but, for one or more reasons, the base station may not provide sidelink resource allocation configuration or assistance for the UEs, and/or may be connected to the base station that may not support NR V2X services, e.g., GSM, UMTS, LTE base stations.

FIG. 2(A) is a schematic representation of an in-coverage scenario in which two UEs directly communicating with each other are both connected to a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a Mode 1 configuration in NR V2X or as a mode 3 configuration in LTE V2X. Thus, in Mode 1, a S-UE, e.g., UE 202 is connected via Uu interface to the gNB, and the gNB coordinates the resources for UE 202 be used to transmit control and/or data to another UE, e.g., UE 204, via a SL interface, which is referred to in NR as PC5.

FIG. 2(B) is a schematic representation of an out-of-coverage scenario in which the UEs directly communicating with each other are either not connected to a base station, although they may be physically within a cell of a wireless communication network, or some or all of the UEs directly communicating with each other are connected to a base station but the base station does not provide for the SL resource allocation configuration or assistance. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a Mode 2 configuration in NR V2X or as a Mode 4 configuration in LTE V2X. As mentioned above, the scenario in FIG. 2(B) which is the out-of-coverage scenario does not necessarily mean that the respective Mode 2 UEs in NR or mode 4 UEs in LTE are outside of the coverage 200 of a base station, rather, it means that the respective Mode 2 UEs in NR or mode 4 UEs in LTE are not served by a base station, are not connected to the base station of the coverage area, or are connected to the base station but receive no SL resource allocation configuration or assistance from the base station.

Thus, there may be situations in which, within the coverage area 200 shown in FIG. 2(A), in addition to the NR Mode 1 or LTE Mode 3 UEs 202, 204 also NR Mode 2 or LTE mode 4 UEs 206, 208, 210 are present. In addition, FIG. 2(B), schematically illustrates an out of coverage UE using a relay to communicate with the network. For example, the UE 210 may communicate over the sidelink with UE 212 which, in turn, may be connected to the gNB via the Uu interface. Thus, UE 212 may relay information between the gNB and the UE 210. Thus, the SL-UEs, e.g., UEs 206-210, need not to have a connectivity to the gNB, and perform a sensing & access resource allocation or a random access-based resource allocation, e.g., when transmitting from UE 206 to UE 208. Nevertheless, basic configurations need to be available for the UEs 206-210, in order to successfully exchange data. This information may be pre-configured or may be configured while a UE is within coverage of the gNB. For this the gNB may provide a basic configuration, e.g., basic information, which may be transported via a broadcast channel, e.g., using system information blocks (SIBs). The BS may also assist Mode 2 UEs to provide basic information on which resource pool (RP) is to be used or may act as a synchronization source.

Although FIG. 2(A) and FIG. 2(B) illustrate vehicular UEs, it is noted that the described in-coverage and out-of-coverage scenarios also apply for non-vehicular UEs. In other words, any UE, like a hand-held device, communicating directly with another UE using SL channels may be in-coverage and out-of-coverage.

In general, Mode 1 refers to a RAN-supported operation including base stations, whereas Mode 2 refers to an autonomous mode, where UEs communicate directly without support of a base station. In the context of WiFi, the coordination done by a WiFi access point, AP, may be referred to as a similar operation as Mode 1, whereas Mode 2 translates to the WiFi autonomous mode. In the latter, two WiFi devices may directly communicate with each other without assistance by the WiFi AP.

In the above-described scenarios of vehicular user devices, UEs, a plurality of such user devices may form a user device group, also referred to simply as group, and the communication within the group or among the group members may be performed via the sidelink interfaces between the user devices, like the PC5 interface. For example, the above-described scenarios using vehicular user devices may be employed in the field of the transport industry in which a plurality of vehicles being equipped with vehicular user devices may be grouped together, for example, by a remote driving application. Other use cases in which a plurality of user devices may be grouped together for a sidelink communication among each other include, for example, factory automation and electrical power distribution. In the case of factory automation, a plurality of mobile or stationary machines within a factory may be equipped with user devices and grouped together for a sidelink communication, for example for controlling the operation of the machine, like a motion control of a robot. In the case of electrical power distribution, entities within the power distribution grid may be equipped with respective user devices which, within a certain area of the system may be grouped together so as to communicate via a sidelink communication with each other so as to allow for monitoring the system and for dealing with power distribution grid failures and outages.

In a wireless communication network as described above, for allowing a communication among the network entities, a user device, UE, provides the network with its capabilities so that an operation of the UE may be controlled according to the functions the UE may perform while other functions, the UE is not capable to perform, are not activated in the UE by the network side. The UE capability information may be sent to the network, for example during an initial registration process, in the form of an RRC message for informing the network on the details of the UEs capabilities. Thus, by means of the UE capability reporting, for example via the RRC mechanism, the UE may inform its static applicable capabilities via UE capability information message to the network. With the evolution of wireless communication networks, e.g., the 3GPP Standards, the data volume of the UE capability information, as it is, for example defined in 3GPP TS 38.306, increased and increases further with every new release due to additional features supported by the UEs, for example including artificial intelligence/machine learning, AI/ML, related features. Such AI/ML related features may be employed for various use cases, such as beam prediction, channel state information, CSI, prediction, CSI compression, positioning as well as for mobility and network enhancements. Implementing AI/ML models for the mentioned use cases also impacts the user device so that when allowing the user device to operate in accordance with one or more AI/ML models for performing certain functions or in certain use cases, the data volume of the UE capability information further increases. Also, a handling of AI/ML models need to be implemented.

It is noted that the information in the above section is only for enhancing the understanding of the background of the invention and, therefore, it may contain information that does not form conventional technology that is already known to a person of ordinary skill in the art.

Starting from the above, there may be a need for improvements or enhancements of the UE capability reporting and the handling of AI/ML models in a wireless communication system or network.

SUMMARY

An embodiment may have a user device, UE, for a wireless communication network, like a $3^{rd}$ Generation Partnership Project, 3GPP, network, wherein the UE has a plurality of UE capabilities, the UE capabilities indicating functions the UE is capable to perform, and wherein the UE is to inform on one or more parts of the plurality of UE capabilities using one or more identification values, e.g., hash values.

Another embodiment may have a network entity for a wireless communication network, like a $3^{rd}$ Generation Partnership Project, 3GPP, network, wherein the network entity is to receive from a user device, UE, information on the UE capabilities, the UE capabilities indicating functions the UE is capable to perform, wherein the information has one or more identification values, like hash values, identifying one or more parts of the plurality of UE capabilities, and wherein the network entity is to determine UE capabilities using the received one or more identification values.

According to another embodiment, a method for operating a network entity for a wireless communication network, like a $3^{rd}$ Generation Partnership Project, 3GPP, network, may have the steps of: receiving from a user device, UE, information on the UE capabilities, the UE capabilities indicating functions the UE is capable to perform, wherein the information has one or more identification values, like hash values, identifying one or more parts of the plurality of UE capabilities, and determining UE capabilities using the received one or more identification values.

BRIEF DESCRIPTION OF THE DRAWINGS

Embodiments of the present invention are now described in further detail with reference to the accompanying drawings, in which:

FIGS. 1(A)-(B) illustrate a wireless communication network, wherein FIG. 1(A) is a schematic representation of an example of a terrestrial wireless network, and FIG. 1(B) is a schematic representation of an example of a radio access network, RAN;

FIG. 3 illustrates an example of some UE radio access capability parameters as defined in 3GPP TS 38.306;

DETAILED DESCRIPTION OF THE INVENTION

Embodiments of the present invention are now described in more detail with reference to the accompanying drawings, in which the same or similar elements have the same reference signs assigned.

Figures 1A, 1B:
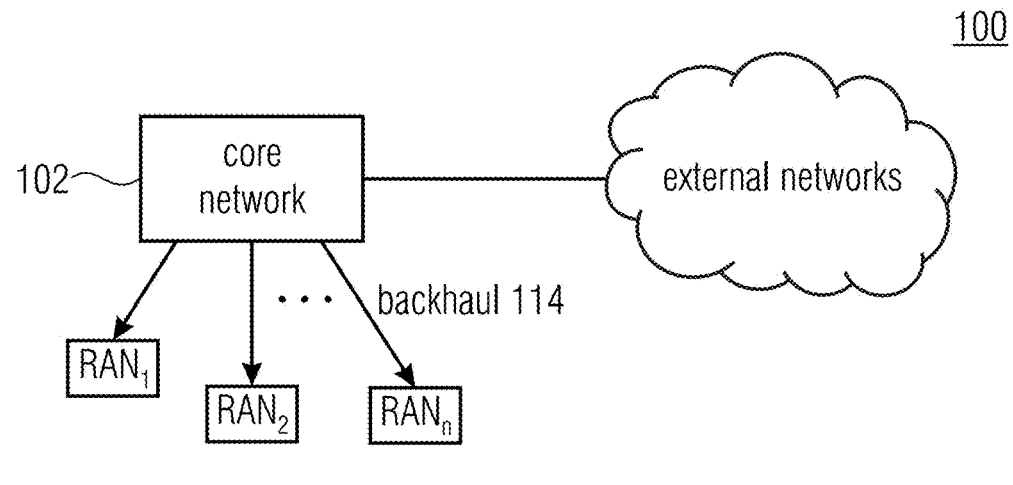

As mentioned above, in a mobile communication system or network, like the one described above with reference to FIG. 1(A) and FIG. 1(B), for example in a LTE or 5G/NR network, a user device, UE, sends a message informing the network about its applicable capabilities, for example by sending a UE capability information message carrying the UE capability information defined in 3GPP TS 38.306. FIG. 3 illustrates an example of some UE radio access capability parameters as defined in 3GPP TS 38.306 which are signaled to the network to be supported and/or not supported. As may be seen from FIG. 3, a UE capability report provides information of what functions the UE may perform, basically indicating whether a certain function is supported or is not supported. It is noted that FIG. 3 is only a brief extract of the radio access capability parameters, and the actual number in the current version of the 3GPP TS 38.306 is much higher. Assuming that, in addition to the already existing parameters, additional parameters, e.g., for defining AI/ML functionality implemented within a user device, is added, it is readily apparent, that the signaling of the UE capabilities becomes more extensive and more complex leading to an undesired signaling overhead within the wireless communication network. This, in turn may lead to an undesired extension of the time required until a UE may actually communicate within the network, e.g., after initially joining the network.

Further, as mentioned above, AI/ML models may be used in the wireless communication network for implementing certain functions, and a user device needs to store or cache the AI/ML models or AI/ML related data for implementing an AI/ML model at the UE. However, a single AI/ML model may not be applicable at all times or in all environments so that, for example, when changing from one geographical area to another geographical area, a currently used AI/ML model may no longer be applicable and needs to be updated or replaced by a new AI/ML model. Any information needs to be signaled to the UE from the network side. Thus, due to the increased signaling required for updating the AI/ML model or implementing a new AI/ML model, the time until the UE may operate, e.g., in the new geographical location, extends so that an ongoing communication may be interrupted.

Embodiments of the present invention address the above needs by providing approaches allowing for a reduction of the signaling overhead during UE capability reporting and/or for an AI/ML model update in a user device, thereby avoiding delays or interruptions of a communication due to the signaling of UE capabilities and/or AI/ML model updates. Embodiments of the present invention are advantageous over conventional approaches as by means of the subsequently described aspects improvements of the signaling of UE capabilities and/or AI/ML model updates are achieved leading to a significant reduction of the signaling overhead, thereby avoiding undesired delays or interruption of the operation of the user device.

Figure 2A:
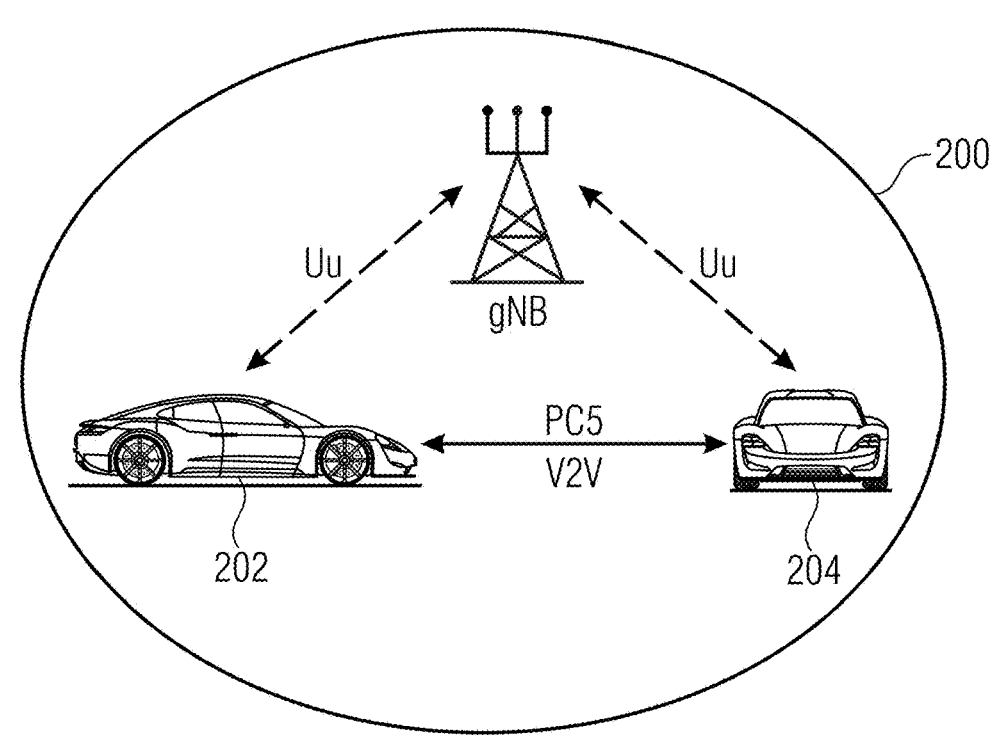
FIG. 2(A) is a schematic representation of an in-coverage scenario.
Figure 2B:
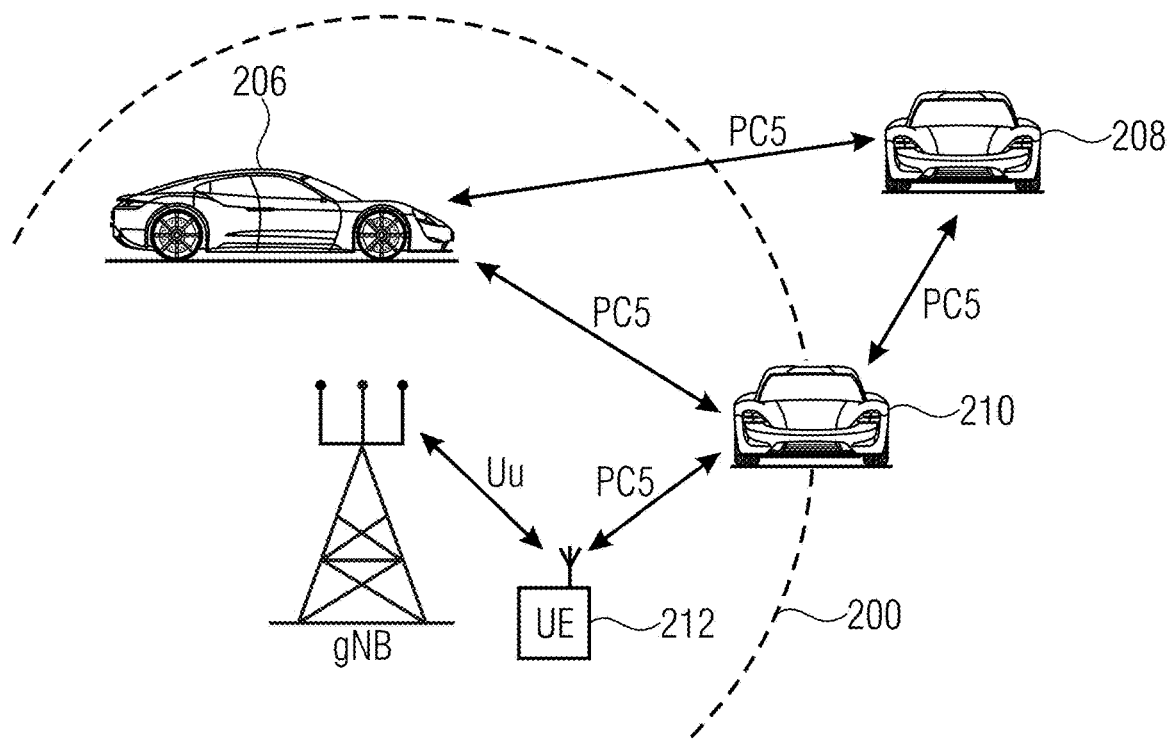
FIG. 2(B) is a schematic representation of an out-of-coverage scenario.
Figure 4:
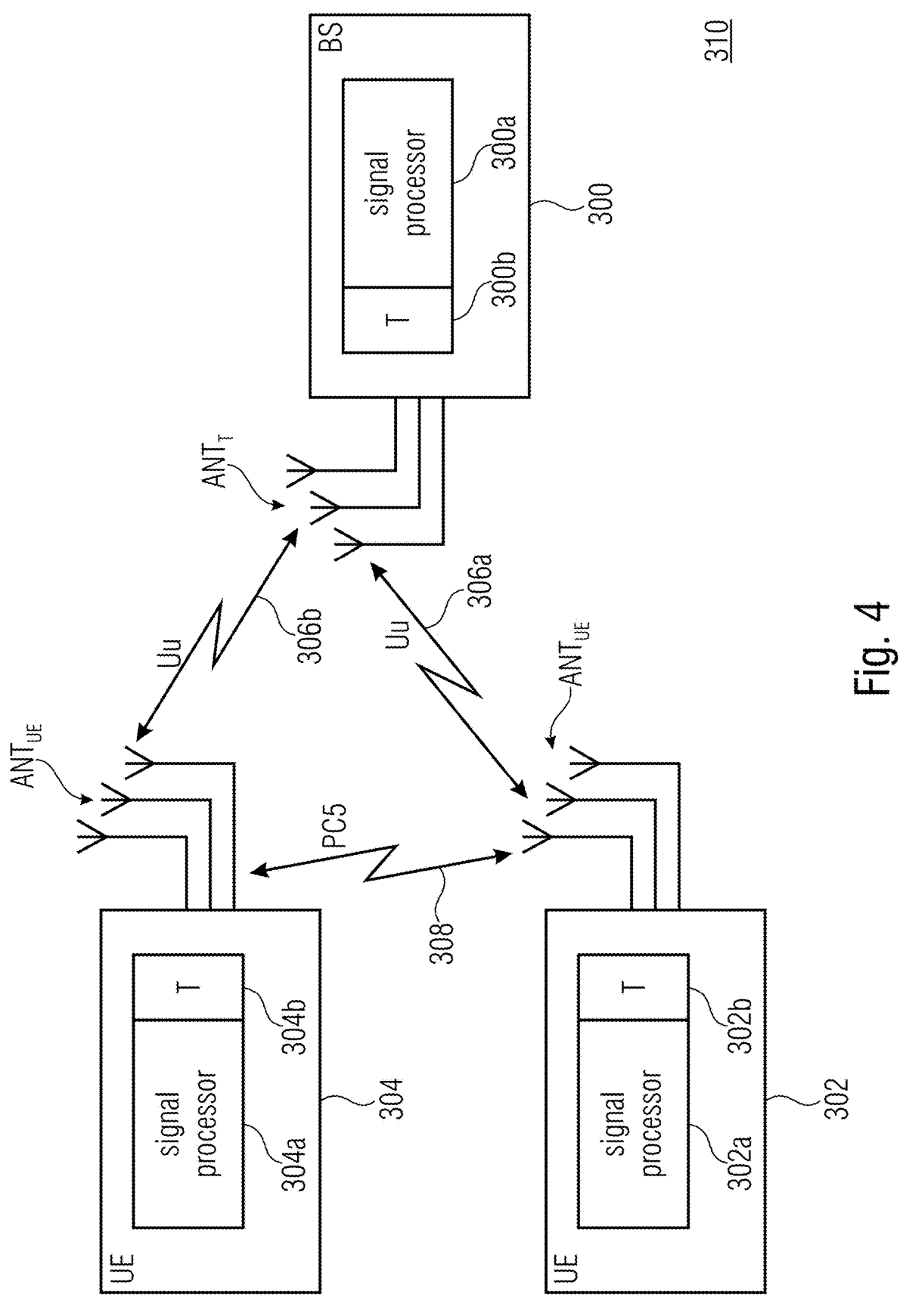
FIG. 4 is a schematic representation of a wireless communication system including a transmitter, like a base station, and one or more receivers, like user devices, UEs, implementing embodiments of the present invention.

Embodiments of the present invention may be implemented in a wireless communication system as depicted in FIG. 1, FIG. 2(A) or FIG. 2(B) including base stations and users, like mobile terminals or IoT devices. FIG. 4 is a schematic representation of a wireless communication system 310 including a transmitter 300, like a base station, and one or more receivers 302, 304, like user devices, UEs. The transmitter 300 and the receivers 302, 304 may communicate via one or more wireless communication links or channels 306a, 306b, 308, like a radio link. The transmitter 300 may include one or more antennas $ANT_T$ or an antenna array having a plurality of antenna elements, a signal processor 300a and a transceiver 300b, coupled with each other. The receivers 302, 304 include one or more antennas $ANT_{UE}$ or an antenna array having a plurality of antennas, a signal processor 302a, 304a, and a transceiver 302b, 304b coupled with each other. The base station 300 and the UEs 302, 304 may communicate via respective first wireless communication links 306a and 306b, like a radio link using the Uu interface, while the UEs 302, 304 may communicate with each other via a second wireless communication link 308, like a radio link using the PC5 or sidelink, SL, interface. When the UEs are not served by the base station or are not connected to the base station, for example, they are not in an RRC connected state, or, more generally, when no SL resource allocation configuration or assistance is provided by a base station, the UEs may communicate with each other over the sidelink. The system or network of FIG. 4, the one or more UEs 302, 304 of FIG. 4, and the base station 300 of FIG. 4 may operate in accordance with the inventive teachings described herein.

First Aspect

A first aspect of the present invention provides for a modification of the UE capability reporting mechanism. The currently applicable UE capabilities are defined in respective standard, for example in the above mentioned 3GPP TS 38.306 and for all of the capabilities defined in the standard or at least for one or more subsets thereof, the UE needs to signal to the network side whether it supports the respective functions or not. Thus, a UE operating in accordance with a certain release of a standard is aware of the possible capabilities and signals in the UE capability information message which functions the UE supports and/or which functions the UE does not support.

The first aspect of the present invention is based on the inventors finding that within a wireless communication network many of the user devices may have the same or similar capabilities so that the UE capability reports from such UEs are identical or similar, and that such each of the identical or similar UE capability reports may be represented by an identification value. For example, the identification value may be a hash value of the obtained by generating a hash having a fixed length, for example, a hash value which assigns a unique numeric value to the contents of the UE capability reports using a suitable generator, like a MD5 generator. Thus, rather than providing for each of a plurality of UEs respective UE capability reports, a substantial number of UEs may simply signal the identification value which reduces the signaling overhead, because the identification value has a size substantially smaller than the size of the associated UE capability report.

Stated differently, according to the first aspect of the present invention, an identification value is provided which is not associated with a specific UE but is associated with a certain combination of capabilities an arbitrary UE may support and/or not support. UEs having capabilities which at least partly the same or similar, therefore, may use the same identification value for signaling some or all of their capabilities.

User Device

The present invention, according to the first aspect, provides a user device, UE, for a wireless communication network, like a 3$^{rd}$ Generation Partnership Project, 3GPP, network, wherein the UE has a plurality of UE capabilities, the UE capabilities indicating functions the UE is capable to perform, and wherein the UE is to inform on one or more parts of the plurality of UE capabilities using one or more identification values, e.g., hash values.

In accordance with embodiments, each of the parts comprises more than one capability.

In accordance with embodiments, the one or more capabilities comprise one or more of:
one or more features supported by the UE, wherein a feature is linked to one or more functions to be performed by the UE, e.g., carrier aggregation, extended Discontinuous Reception, eDRX, CSI compression,
a support of AI/ML functionality, e.g., CSI compression, positioning, a beam management-related procedure,
a support of a certain AI/ML functionality in a certain scenario/site id/paging area,
one or more memory and/or processing capabilities,
one or more supported band combinations,
one or more antenna configurations,
one or more processing times for, e.g., HARQ feedback, CSI feedback,
supported AI/ML models and/or base models,
one or more parts of an AI/ML model, e.g., a fine tuning that may be based on a base model,
a number of simultaneously configured supported AI/ML models in overall or within given network slice or functionality,
a support of AI/ML performance monitoring.

In accordance with embodiments, the one or more identification values comprise one or more of:
a number,
an alphanumeric value,
an output of a hashing or fingerprinting or checksum function, a vector or list of values, e.g., a hierarchical level of identification followed by a value, type and version,
an enumeration, e.g., a set of named values.

In accordance with embodiments, the one or more identification values are unique.

In accordance with embodiments, the UE is to inform on all UE capabilities using the identification value.

In accordance with embodiments,
the UE is to receive a request, like a UE capability enquiry message, from the wireless communication network or from a further UE to report some or all of the UE capabilities, and
responsive to the request, the UE is to send the identification value representing the requested UE capabilities to the wireless communication network or to the further UE.

In accordance with embodiments, in case the identification value is not known by the wireless communication network or the further UE, responsive to the request, the UE is to send the identification value and the UE capability information message, including the requested UE capabilities, to the wireless communication network or to the further UE.

In accordance with embodiments, the UE is capable to use one or more artificial intelligence/machine learning, AI/ML, models, and the plurality of UE capabilities comprises information on the one or more AI/ML models.

In accordance with embodiments,
each of the one or more AI/ML models is identified by an individual identification value, or
two or more of the AI/ML models are identified by a common identification value.

In accordance with embodiments, each of the AI/ML models is identified by the individual identification value, e.g., an individual hash value, and the common identification value identifying two or more of the AI/ML models may be obtained using the individual identification values, e.g., by hashing the individual hash values.

In accordance with embodiments,
the UE is to store the AI/ML models using a hierarchical structure defining a plurality of more hierarchy levels, e.g., for defining for each feature, a certain scenario and a certain PLMN, and
an AI/ML model is identified using the identification value for the AI/ML model and the hierarchy level at which the AI/ML model is stored.

In accordance with embodiments,
the UE is to receive a request, like a UE capability enquiry message, from the wireless communication network or from a further UE to report some or all of the AI/ML models supported by the UE, and
responsive to the request, the UE is to send the one or more identification values representing the supported AI/ML models to the wireless communication network or to the further UE.

In accordance with embodiments,
the UE is to receive from the wireless communication network or from a further UE a request indicating one or more identification values or a common identification value representing AI/ML models, and
responsive to the request, the UE is to
deactivate the one or more AI/ML models indicated by the one or more identification values or the common identification value, or
reset the one or more AI/ML models indicated by the one or more identification values or the common identification value into a predefined state.

In accordance with embodiments, the UE is to receive from the wireless communication network or from a further UE one or more additional AI/ML models to be supported by the UE, and store the one or more additional AI/ML models.

In accordance with embodiments, determine for each of the additional AI/ML models or for some or all each of the additional AI/ML models an identification value, and/or report the identification value to the wireless communication network or to the further UE.

In accordance with embodiments, the UE is to receive from the wireless communication network or from a further UE the respective identification values for the additional AI/ML models, determine, using the respective identification values, for some or all of the additional AI/ML models an identification value, and/or report the identification value identifying some or all of the additional AI/ML models to the wireless communication network or to the further UE.

In accordance with embodiments, the UE is to receive from the wireless communication network or from a further UE a message, like a Master Information Block, MIB, or a System Information Block, SIB, indicating one or more identification values or a common identification value representing AI/ML models, and responsive to the message, the UE is to use the one or more AI/ML models indicated by the one or more identification values or the common identification value as default AI/ML model, or use among the one or more AI/ML models indicated by the one or more identification values or the common identification value a first AI/ML model supported by the UE as default AI/ML model, or bar the one or more AI/ML models indicated by the one or more identification values or the common identification value from being used by the UE.

In accordance with embodiments, the UE is to signal barring information to the wireless communication network or to a further UE.

In accordance with embodiments, the UE is to include within the barring information one or more:

the one or more identification values of the one or more AI/ML models it has barred, a barring time, e.g., how long the model is barred, a trigger condition that has to be fulfilled to unbar the AI/ML model.

In accordance with embodiments, the UE is to store for one or more features one or more each AI/ML models, a feature being linked to one or more functions to be performed by the UE, e.g., to a physical layer function, like a CSI feedback mechanism or a CSI compression function, or to a positioning function, or to a beam management-related function.

In accordance with embodiments, the UE is to store for some or all of the AI/ML models one or more of the following:

a validity of the AI/ML model, an origin of the AI/ML model, the wireless communication network, like a Public Land Mobile Network, PLMN, linked to the identification value or to the common identification value of the AI/ML model.

In accordance with embodiments, a AI/ML model is valid when one or more of the following applies:

a predefined time duration has not expired, the UE is at a predefined geographical area, like a certain PLMN, a certain cell ID, a certain paging area, a certain zone, a hash check indicates a correspondence with a version of the AI/ML model stored on a certain server from which the AI/ML model originates, an authorization to use the AI/ML model is given, a power consumption and/or a complexity of the AI/ML model is below a predefined threshold, a certain use case applies, e.g., the UE is to allow for a communication within a certain frequency range, or at a certain time, or at a certain speed, or with a certain Quality of Service, QoS, compatibility, or with a certain priority, or in a certain scenario, like highway, urban, rural, a storage space for the AI/ML modes does not exceed a predefined level.

Network Entity

The present invention, according to the first aspect, provides a network entity for a wireless communication network, like a $3^{rd}$ Generation Partnership Project, 3GPP, network, wherein the network entity is to receive from a user device, UE, information on the UE capabilities, the UE capabilities indicating functions the UE is capable to perform, wherein the information comprises one or more identification values, like hash values, identifying one or more parts of the plurality of UE capabilities, and wherein the network entity is to determine UE capabilities using the received one or more identification values.

In accordance with embodiments, the network entity is to send to one or more of the UEs a request for obtaining UE capabilities, like a UE capability enquiry message, and receive from the one or more UEs an identification value representing the requested UE capabilities.

In accordance with embodiments, in case the identification value from a UE is not known by the network entity, the network entity is to request the UE to send a UE capability information message including the requested UE capabilities and the identification value.

In accordance with embodiments, for determining the UE capabilities, the network entity is to access a local or remote data base using the identification value, the data base comprising a plurality of data record, each data record indicating one or more capabilities of a certain UE, and each data record being associated with an identification value.

In accordance with embodiments, the local data base is stored by the network entity, and the remote data base is stored at location in the wireless communication network different from the network entity or a location outside the wireless communication network, e.g., on a server accessible via the Internet.

In accordance with embodiments, the network entity is to serve one or more user devices, UEs, the one or more UEs being capable to use one or more artificial intelligence/machine learning, AI/ML, models, each AI/ML model including one or more features, a feature being linked to one or more functions to be performed by the UE, e.g., to a physical layer function, like a CSI feedback mechanism or a CSI compression function, or to a positioning function, and the UE capabilities comprise information on the one or more AI/ML models.

Methods

The present invention, according to the first aspect, provides a method for operating a user device, UE, for a wireless communication network, like a 3<sup>rd</sup> Generation Partnership Project, 3GPP, network, wherein the UE has a plurality of UE capabilities, the UE capabilities indicating functions the UE is capable to perform, the method comprising:

informing on one or more parts of the plurality of UE capabilities using one or more identification values, e.g., hash values.

The present invention, according to the first aspect, provides a method for operating a network entity for a wireless communication network, like a 3<sup>rd</sup> Generation Partnership Project, 3GPP, network, the method comprising:

receiving from a user device, UE, information on the UE capabilities, the UE capabilities indicating functions the UE is capable to perform, wherein the information comprises one or more identification values, like hash values, identifying one or more parts of the plurality of UE capabilities, and determining UE capabilities using the received one or more identification values.

Second Aspect

Embodiments of the second aspect of the present invention address the need for improving the update of AI/ML models employed by a user device. Conventionally, for example when the UE moves from one location to another location, an update of an AI/ML model for implementing a certain function may be required, which is achieved by a respective signaling from the network side to the UE and lead to an undesired signaling overhead. In accordance with embodiments of the second aspect of the present invention, such signaling overhead is avoided by allowing the UE to store or cache for one or more features a plurality of AI/ML models. A feature is linked to one or more functions to be performed by the UE, e.g., to a physical layer function, like a CSI feedback mechanism or a CSI compression function, or to a positioning function, and for implementing a certain function at the UE, the plurality of AI/ML models is stored. For example a first AI/ML model to be used for a first time duration and a second AI/ML model for a subsequent time duration, or different AI/ML models for different geographical locations may be stored so that once a currently used AI/ML model is no longer applicable, rather than requesting the update via the network side, the UE has already stored or cached the AI/ML model to be used, thereby avoiding the additional signaling overhead for updating a currently used AI/ML model.

User Device

The present invention, according to the second aspect, provides a user device, UE, for a wireless communication network, like a 3<sup>rd</sup> Generation Partnership Project, 3GPP, network, wherein the UE is capable to use one or more artificial intelligence/machine learning, AI/ML, models, and wherein the UE is to store for one or more features a plurality of AI/ML models, a feature being linked to one or more functions to be performed by the UE, e.g., to a physical layer function, like a CSI feedback mechanism or a CSI compression function, or to a positioning function.

In accordance with embodiments, the UE is to store for some or all of the AI/ML models one or more of the following:

a validity of the AI/ML model, an origin of the AI/ML model, the wireless communication network, like a Public Land Mobile Network, PLMN, cell ID, gNB ID, beam ID, linked to the AI/ML model, a UE ID, e.g., in case it has received the AI/ML model from a further UE.

In accordance with embodiments, a AI/ML model is valid when one or more of the following applies:

a predefined time duration has not expired, the UE is at a predefined geographical area, like a certain PLMN, a certain cell ID, a certain paging area, a certain zone, a hash check indicates a correspondence with a version of the AI/ML model stored on a certain server from which the AI/ML model originates, an authorization to use the AI/ML model is given, a power consumption and/or a complexity of the AI/ML model is below a predefined threshold, a certain use case applies, e.g., the UE is to allow for a communication within a certain frequency range, or at a certain time, or at a certain speed, or within a certain network slice, or with a certain Quality of Service, QoS, compatibility, or with a certain priority, or in a certain scenario, like highway, urban, rural, a storage space for the AI/ML modes does not exceed a predefined level.

In accordance with embodiments, an AI/ML model is identified by a non-unique identification value used at different origins of the AI/ML model, like different AI/ML servers or different wireless communication networks, and wherein the UE is to link the AI/ML model with the origin of the AI/ML model.

In accordance with embodiments, the UE is to store an AI/ML model after the last use thereof for a certain time duration, or indefinitely, or until a certain event occurs.

In accordance with embodiments, the certain event comprises one or more of the following:

a storage space for the AI/ML modes falls below a predefined level, or the UE moves to a certain location, or a deletion of the model is signaled by the network or a further UE, or a storage space is needed for a different purpose, e.g. to perform a software update or to store system or program or user data, or the UE uses a certain interface, e.g., switches from a communication over the Uu interface to a communication over the PC5 interface or vice versa.

In accordance with embodiments, the UE is to associate each of the stored AI/ML models with an identification value, like a hash value, and wherein the UE is to re-activate an AI/ML model after the last use using the identification value.

In accordance with embodiments, the UE is to update one or more of the stored AI/ML models.

In accordance with embodiments, an AI/ML model is updated partly or in full, and/or the UE is to pull an AI/ML model update, and/or an AI/ML model update is pushed to the UE, and/or an AI/ML model is updated in case a difference is detected between the AI/ML model stored at the UE and the AI/ML model stored at an origin of the AI/ML model, and/or an AI/ML model update comprises an update of one or more validity conditions of the AI/ML model, e.g., a change in the validity time, or a change of a geographical area in which the UE is located, or a use of a different set of resources, like a different resource pool.

In accordance with embodiments, each AI/ML model is identified by an individual identification value, or two or more of the AI/ML models are identified by a common identification value.

In accordance with embodiments, each of the AI/ML models is identified by the individual identification value, e.g., an individual hash value, and the common identification value identifying two or more of the AI/ML models is obtained using the individual identification values, e.g., by hashing the individual hash values.

In accordance with embodiments, the UE is to store the AI/ML models using an hierarchical structure defining a plurality of more hierarchy levels, e.g., for defining for each feature, a certain scenario and a certain PLMN, and an AI/ML model is identified using the identification value the AI/ML model and the hierarchy level at which the AI/ML model is stored.

Network Entity

The present invention, according to the second aspect, provides a network entity for a wireless communication network, like a 3$^{rd}$ Generation Partnership Project, 3GPP, network, wherein the network entity is to serve one or more user devices, UEs, the one or more UEs being capable to store for one or more features a plurality of artificial intelligence/machine learning, AI/ML, models supported by the UE, a feature being linked to one or more functions to be performed by the UE, e.g., to a physical layer function, like a CSI feedback mechanism or a CSI compression function, or to a positioning function, and wherein the network entity is to provide to a UE the AI/ML models supported by the UE, and/or update the AI/ML models supported by the UE.

Methods

The present invention, according to the second aspect, provides a method for operating a user device, UE, for a wireless communication network, like a 3$^{rd}$ Generation Partnership Project, 3GPP, network, wherein the UE is capable to use one or more artificial intelligence/machine learning, AI/ML, models, the method comprising:

storing for one or more features a plurality of AI/ML models, a feature being linked to one or more functions to be performed by the UE, e.g., to a physical layer function, like a CSI feedback mechanism or a CSI compression function, or to a positioning function.

The present invention, according to the second aspect, provides a method for operating a network entity for a wireless communication network, like a 3$^{rd}$ Generation Partnership Project, 3GPP, network, the method comprising:

serving one or more user devices, UEs, the one or more UEs being capable to store for one or more features a plurality of artificial intelligence/machine learning, AI/ML, models supported by the UE, a feature being linked to one or more functions to be performed by the UE, e.g., to a physical layer function, like a CSI feedback mechanism or a CSI compression function, or to a positioning function, and providing to a UE the AI/ML models supported by the UE, and/or updating the AI/ML models supported by the UE.

First and Second Aspect

In accordance with embodiments, the UE comprises one or more of the following: a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and requiring input from a gateway node at periodic intervals, or a mobile terminal, or a stationary terminal, or a cellular IoT-UE, or a SL UE, or a vehicular UE, or a vehicular group leader UE, GL-UE, or a scheduling UE, S-UE, or an IoT or narrowband IoT, NB-IoT, device, or a ground based vehicle, or an aerial vehicle, or a drone, or a moving base station, or road side unit, RSU, or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or a Wi-Fi device, station (STA), access point (AP), node or mesh node, or mesh point, or Mesh AP, or any sidelink capable network entity.

In accordance with embodiments, the network entity comprises one or more of the following:

a base station, like a macro cell base station, or a small cell base station, or a central unit of a base station, or a distributed unit of a base station, or an Integrated Access and Backhaul, IAB, node, or a Wi-Fi device such as an access point (AP) or mesh node (Mesh AP)

a road side unit, RSU, a UE, like a SL UE, or a group leader UE, GL-UE, or a relay UE, a remote radio head, a core network entity, like an Access and Mobility Management Function, AMF, or a Service Management Function, SMF, or a mobile edge computing, MEC, entity, a network slice as in the NR or 5G core context, any transmission/reception point, TRP, enabling an item or a device to communicate using the wireless communication network, the item or device being provided with network connectivity to communicate using the wireless communication network.

The present invention provides a wireless communication system, like a 3$^{rd}$ Generation Partnership Project, 3GPP, system, comprising one or more of the inventive user devices, UEs, and/or one or more of the inventive network entities.

The present invention provides a computer program product comprising instructions which, when the program is executed by a computer, causes the computer to carry out one or more methods in accordance with the present invention.

Embodiments of the inventive aspect are now described in more detail with reference to the accompanying drawing. It is noted that the subsequently outlined and described aspects or embodiments may be combined such that some or all of the aspects/embodiments are implemented within one embodiment. Further, it is noted that when referring to "resources", in this description, a resource is to be understood as comprising one or more of the following:

one or more symbols, one or more time slots or subframes or frames, one or more frequencies or carriers or subchannels or group of subchannels, one or more interlaces, one or more frequency bands, like unlicensed subbands, one or more bandwidth parts, one or more resource pools, one or more LBT sub-bands, one or more spatial resources, e.g., using spatial multiplexing, precoding and/or beamforming.

Furthermore, it is noted that when referring to "a set of resources", in this description, a set of resources may contain one or more than one resource, with the definition of a resource as mentioned above. Moreover, it is noted that when referring to a "channel", in this description, this may refer to a set of the resources as mentioned above. Thus, a "channel" may also refer to a single carrier, a sub-channel, a sub-band, a resource pool or a SL BWP.

First Aspect

Figure 5:
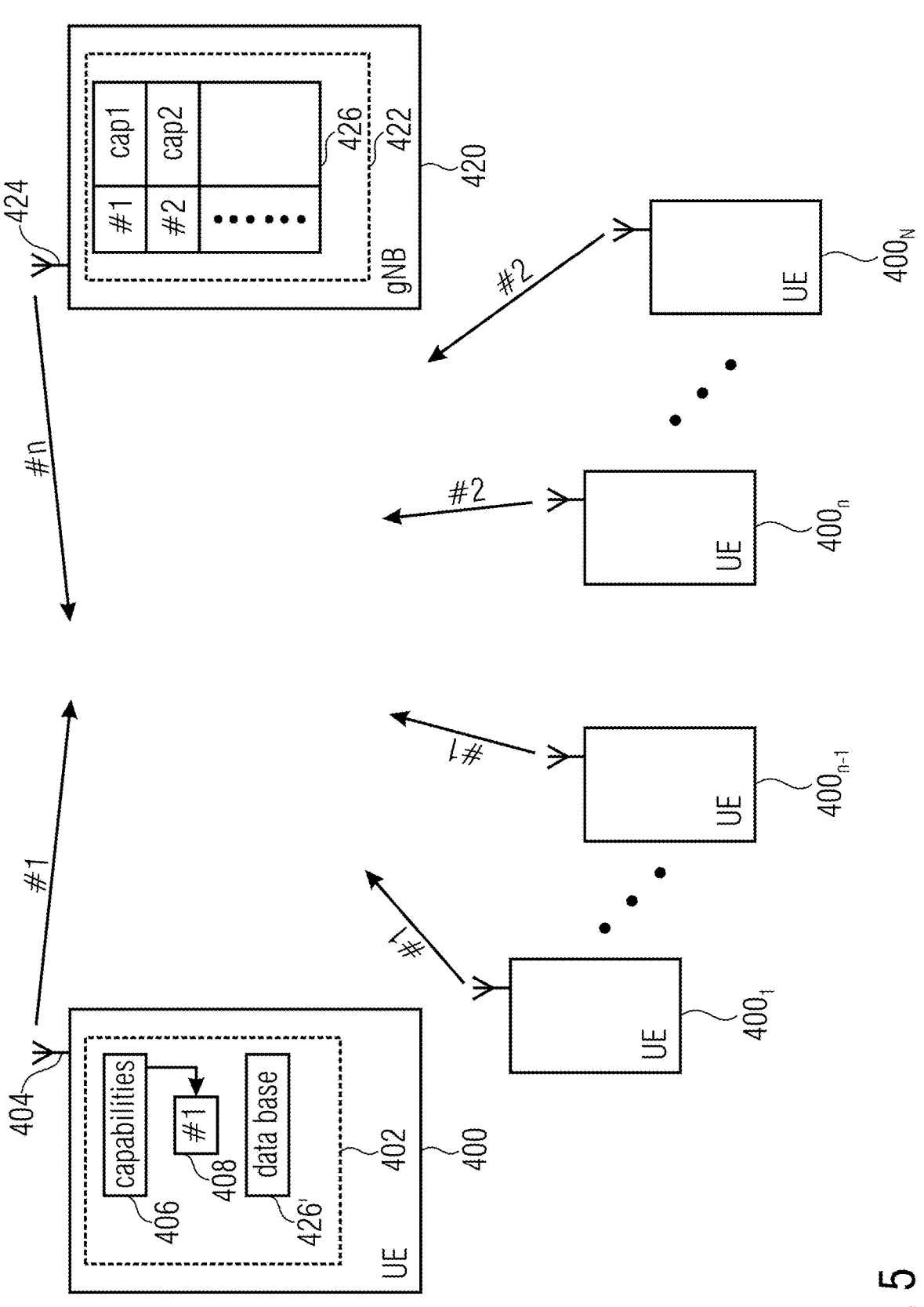
FIG. 5 illustrates embodiments of a first aspect of the present invention.

FIG. 5 illustrates embodiments of the first aspect of the present invention. A user device, UE, 400 is illustrated which includes a signaling processing unit 402 and one or more antennas or one or more antenna arrays including one or more antenna elements 404. As is indicated at 406, the UE 400 is has certain capabilities, i.e., is capable to perform certain functions. UE 400 needs to signal its capabilities to the network side using, for example, a UE capability report or a UE capability information message. In accordance with embodiments of the first aspect of the present invention, rather than signaling to the network side whether functions, for example as defined by the applicable standardization, are supported and/or not supported, the UE transmits an identification value #1 which is associated with one or more parts of the plurality of UE capabilities 406 of the UE 400, as is indicated at 408. In other words, in accordance with embodiments of the first aspect of the present invention, the contents of the UE capability report indicating which functions are supported and/or not supported is replaced by the identification value #1 which, advantageously, has a fixed size so that the UE capability information or report signaled by UE 400 via its antenna 404 towards the network side includes for at least a part of the UE capabilities the identification value #1, thereby reducing a size of the signaled message.

For example, a regular or legacy UE capability report may have as a contents a series of first and second values, like "1s" and "0s" representing that functions associated with a certain position in the series are supports (indicated by a "1") or not (indicated by a "0"). For this series a hash value having a fixed length may be generated using, for example, a MD5 generator and used as the identification value. Thus, rather than sending in the UE capability report explicitly the information whether a function is supported or not, in accordance with embodiments of the first aspect of the present invention, the hash value is transmitted to the network. Even when additional capabilities/functions evolve that need to be included into the UE capability report, by creating the hash value for the larger report the signaling overhead for providing the UE capability report remains stable and an increase is only small.

Assuming that within a wireless communication network, the number of UEs having at least in part similar or the same capabilities may be quite high, the conventional transmission of a complete UE capability report for each of the UEs and the associated signaling overhead is avoided by only sending the identification value associated with a certain combination of supported/non-supported UE capabilities/functions which reduces the signaling overhead, as only the identification value is signaled for the same/similar capabilities by the respective UEs and the capabilities/functions associated with the identification value may be determined at the network side, e.g., from a database or a lookup table in which the supported/non-supported UE capabilities/functions are stored and associated with the respective identification value. Thus, except for sending the complete or legacy UE capability report together with the identification value at a first time so that the capability information associated with the identification value may be stored at the network side, at all other times, UEs having the same or similar UE capabilities simply send the identification value, thereby significantly reducing the signaling overhead.

It is noted that the identification value is not associated with a user device, i.e., by means of the identification value, an UE is not identified, but only some or all of the specific capabilities the UE has are identified, which may be the same or similar to capabilities of other UEs in the system. Thus, by means of the identification value, within the system, the same or similar capabilities implemented in different UEs are identified by a single value which may be included into the UE capability report, thereby transmitting reduced data in the report while still identifying for the different UEs the associated capabilities which leads to the desired reduction in signaling overhead as it is no longer required to transmit the entire set of capabilities as it is needed in the conventional approaches.

As is illustrated in FIG. 5, the wireless communication network may comprise a plurality of user devices, e.g., in addition to UE 400 UEs 400$_1$ to 400$_{n-1}$ and 400$_n$ to 400$_N$. It is noted that the illustrated number of UEs is just an example and the actual number may be lower or higher. Among the UEs it is assumed the UE 400 as well as UEs 400$_1$ to 400$_{n-1}$ have at least in part the same or similar capabilities and operate in accordance with the embodiments of the first aspect of the present invention so that besides UE 400 also UEs 400$_1$ to 400$_{n-1}$, when sending their respective UE capability information, rather than sending the information, only transmit the identification value #1. On the other hand, there may be other devices within the system having different capabilities, for example UEs 400$_n$ to 400$_N$ which send a different identification value representing the UE capabilities of these user devices, like the identification value #2 as illustrated in FIG. 5.

In accordance with further embodiments of the present invention, a network entity, like a gNB 420 is provided which includes a processing entity 422 and one or more antennas or one or more antenna arrays including one or more antenna elements 424. The gNB 420 receives, via its antenna 424, the UE capability information from the plurality of UEs 400 to 400$_N$. The gNB 420 includes or has access to a database or lookup table 426 holding for each of the identification value s #1, #2, . . . the associated capability information. When receiving one of the identification value s #1, #2, the gNB 420 accesses the database 426 via the identification value and derives for the UE which provided the identification value the capabilities of the UE from the database.

In accordance with embodiments, in case the identification value received at the gNB 420 is unknown, the gNB may request a regular or legacy UE capability report from the UE that provided the unknown identification value and then the receive UE capability information for this UE in the database 426 together with the new identification value so that the UE and other UEs having the same or similar capabilities may simply send the identification value which is now known at the gNB. Thus, in accordance with embodiments of the first aspect of the present invention, it may only be necessary to transmit a complete or legacy UE capability report once, for example in response to receiving at the network side an unknown identification value, as then, once the unknown identification value is associated with a certain combination of UE capabilities, any UE in the system having the same or similar UE capabilities uses the same identification value in the report, thereby reducing the signaling overhead for signaling the UE capabilities.

Thus, in accordance with embodiments, UE 400 may inform on one or more parts of the plurality of is capabilities using one or more identification values, e.g. hash value.

In accordance with embodiments, each of the parts comprises more than one capability.

In accordance with embodiments, the one or more capabilities include one or more of:

one or more features supported by the UE, wherein a feature is linked to one or more functions to be performed by the UE, e.g., carrier aggregation, extended Discontinuous Reception, eDRX, CSI compression, a support of AI/ML functionality, e.g., CSI compression, positioning, a beam management-related procedure, a support of a certain AI/ML functionality in a certain scenario/site id/paging area, one or more memory and/or processing capabilities, one or more supported band combinations, one or more antenna configurations, one or more processing times for, e.g., HARQ feedback, CSI feedback, supported AI/ML models and/or base models, one or more parts of an AI/ML model, e.g., a fine tuning that may be based on a base model a number of simultaneously configured AI/ML models in overall or within given network slice or functionality, a support of AI/ML performance monitoring.

In accordance with embodiments, the identification value includes one or more of:

A number.

An alphanumeric value.

An output of a hashing function or fingerprinting or checksum.

A vector or list of values, e.g., a hierarchical level of identification followed by a value, a type and version.

For example, a type may be models of different complexity for the same or different functionalities. The version then identifies the exact model. As they may change or be updated.

an enumeration, e.g., a set of named values.

In accordance with embodiments, the one or more identification values are unique. For example, an identification value may be unique in the sense that it uniquely identifies the model globally. So that there is not different model with the same identification value in another network or on another UE. In other embodiments, an identification value may be unique within the origin server/PLMN/network/gNB.

In accordance with further embodiments of the first aspect of the present invention, the gNB 420 may store the respective identification values and the associated capability information only temporarily, for example for a predefined time period so that the storage space in the database 426 may be freed, for example in case it is determined that a certain identification value representing a certain UE capability setup has not been received for a certain time or a number of times it has been received is below a threshold so that identification values not used anymore or not used so often may be removed from the data base so as to provide for sufficient space for storing more frequently used identification values and the associated UE capability information.

In accordance with embodiments, the identification value 408 may be associated with all of the UE capabilities 406, while in accordance with other embodiments, the identification value 408 may be associated only with some of the UE capabilities. Using the identification value for only a part of the UE capabilities may be advantageous in situations in which many of the UEs in the wireless communication network have a high number of similar or identical capabilities but may have also different capabilities. Nevertheless, also in such scenarios using the identification value reduces the size of the respective UE capability reports and thereby also the signaling overhead significantly as the information represented by the identification value is already known at the network side and needs not to be transmitted multiple times.

FIG. 5 illustrates embodiments of the first aspect of the present invention in accordance with which the capabilities are signaled from a UE to the network side, for example other over the Uu interface to the gNB 420. In accordance with other embodiments of the first aspect of the invention, rather than providing the capabilities from the UE to the network, the UE may provide the capability information using the inventive approach also to another user device. In other words, UE 400 may provide the identification value #1 to a network entity which is a user device including or having access to the database 426 associating the respective identification values with the UE capabilities in a way as described above. In such embodiments, the UE 400 and the further network entity, like the further UE, may communicate over the sidelink, like the PC5 interface.

In accordance with yet other embodiments, UE 400 may also include the database, as is schematically indicated at 426', holding the identification values and the associated UE capabilities, so that the network side may transmit an identification value #n to UE 400. As is illustrated in FIG. 5, for example, gNB 420 may send the identification value #n to UE 400 which, using database 426', may associate the identification value #n with certain UE capabilities. This approach may be employed in a situation in which, for example, gNB 420 informs UE 400 about specific capabilities of a further UE by means of the identification value #n so as to provide UE 400 with the necessary information on the capabilities of the further UE, for example in case UE 400 is to communicate with a further UE over the sidelink.

In accordance with further embodiments, the UE 400 may receive the identification value #$_n$ also from the further UE itself, rather than from the base station, for example in case the two UEs operate in mode 2, for example during the setup of a communication over the sidelink so that UE 400 has the necessary UE capability information for the sidelink communication.

Figure 6:
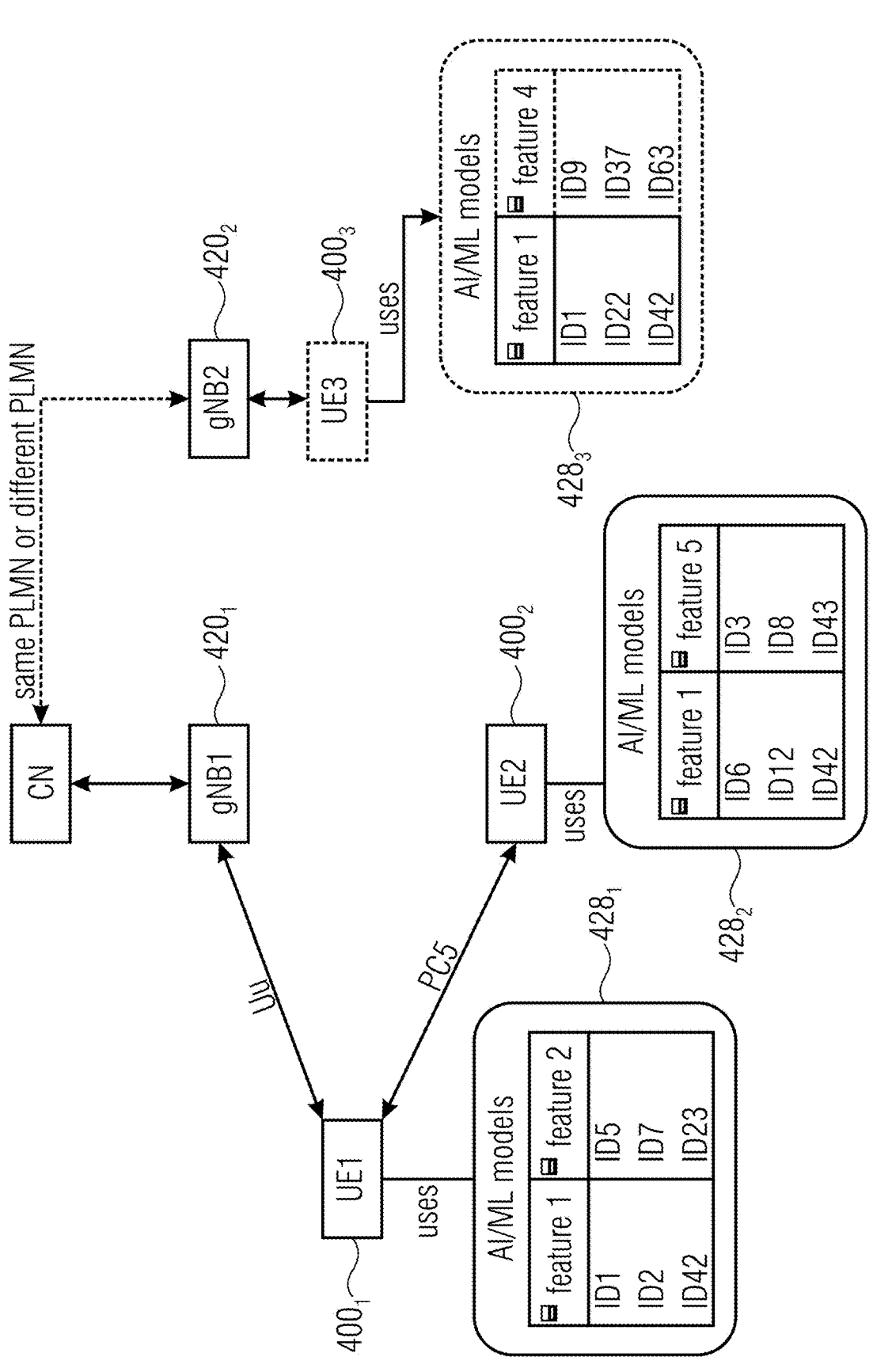
FIG. 6 illustrates an embodiment of a wireless communication network in accordance with which AI/ML models are implemented at the respective UEs.

As mentioned above, the capabilities signaled via the identification value may also include AI/ML-related data in case the UE is capable to implement AI/ML models for performing one or more functions. In accordance with such embodiments, the capabilities also include the information about an AI/ML model implemented at the UE for performing a certain function. FIG. 6 illustrates an embodiment of a wireless communication network in accordance with which AI/ML models are implemented at the respective UEs. FIG. 6 illustrates a wireless communication network including the core network, CN, and the radio access network, RAN, including a first gNB 420₁ and a second gNB 420₂. The gNBs 420₁ and 420₂ are connected to the CN which may handle the RAN entities, like the gNBs 420₁ and 420₂ from the same public land mobile network, PLMN, or from different PLMNs. A first UE 400₁ is connected via the Uu interface to the first gNB 420₁, and to a second UE 400₂ over the sidelink, like the PC5 interface. A further UE 400₃ is connected via the Uu interface to the second gNB 420₂. A Each of the depicted UEs 400₁ to 400₃ may implement one or more features, like Feature1, Feature2, Feature4 and Feature5 in FIG. 6. A feature is linked one or more functions to be performed by the UE, e.g., to a physical layer function, like a CSI feedback mechanism or a CSI compression function, or to a positioning function, or to a beam management-related function. Each features may include one or more AI/ML models or algorithms for implementing the one or more functions. In FIG. 6, the respective AI/ML models of a certain feature are indicated by an identification value ID # according to the first aspect of the present invention, as is illustrated at 428₁ to 428₃. Some of the UEs may use the same AI/ML models which are identified by the same identification value, see for example ID1, ID42. When signaling UE capabilities related to the AI/ML models used by a certain UE, the identification value may be employed for AI/ML related data which is the same or similar in a plurality of the UEs. The other AI/ML models, which may be used by to the UEs in the system, are identified by other identification values.

Figure 7:
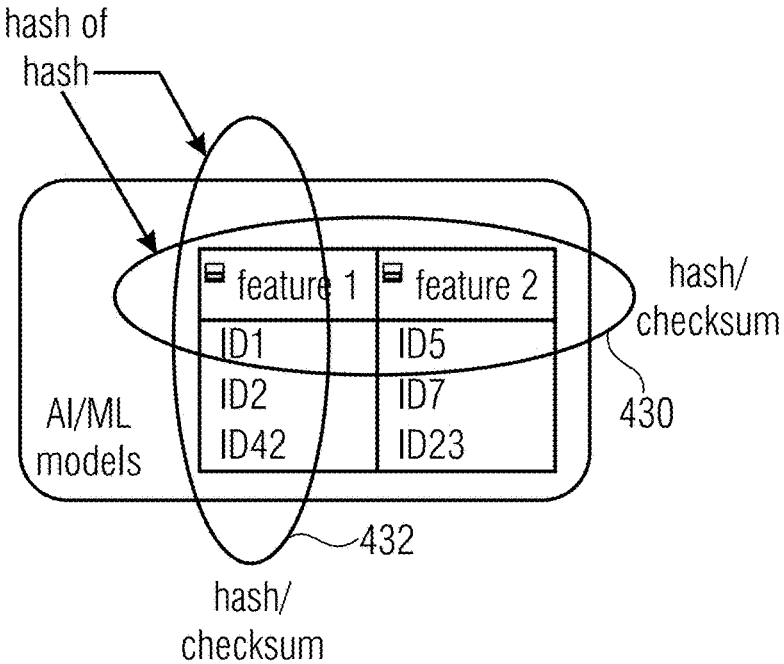
FIG. 7 illustrates embodiments for identifying sets of AI/ML models.

In accordance with embodiments, an AI/ML model may be identified by an identification value, like a hash value, and a set of AI/ML models, i.e., two or more AI/ML models, may be identified by a joint identification value, like a joint hash value, a checksum, or a set of hash values or checksums. FIG. 7 illustrates embodiments for identifying sets of AI/ML models. In accordance with embodiments, as is illustrated at 430, two or more AI/ML models ID1 and ID5 provided for implementing Feature1 and Feature2, respectively, may be identified by an identification value, e.g., a hash value of the respective hash values used for identifying each of the two models. In accordance with other embodiments, the AI/ML models ID1, ID2 and ID42 provided for implementing Feature1 may be identified by an identification value, as is illustrated at 432.

Thus, using the UE capability report and the inventive approach of using an identification value, the network may request supported AI/ML models from a UE, for example by sending a UE capability enquiry message causing the UE to return currently supported AI/ML models individually or as sets using the identification value.

Figure 8:
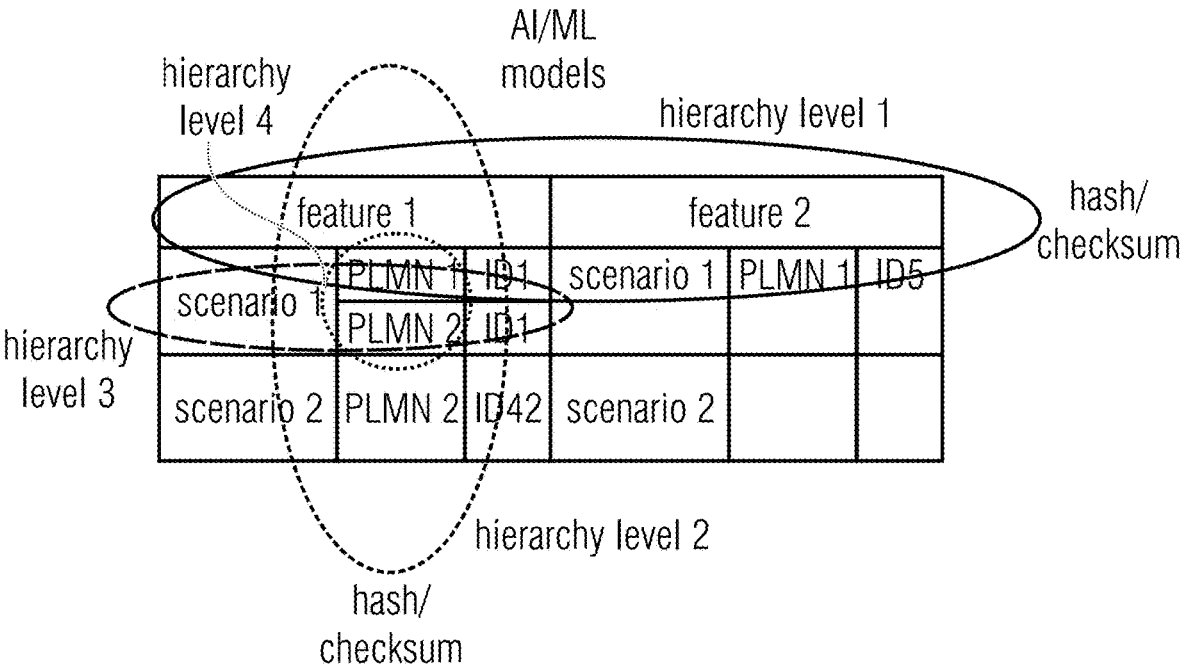
FIG. 8 illustrates an embodiment for storing AI/ML models according to a hierarchical structure.

In accordance with embodiments, the AI/ML models may be stored by the UE using a hierarchical structure. FIG. 8 illustrates an embodiment for storing AI/ML models according to a hierarchical structure. It is assumed that the UE stores AI/ML models for Feature1 and for Feature2. For each feature the AI/ML models are stored for different scenarios or use cases, e.g., for the CSI compression feature multiple scenarios might be considered, such as: urban scenario, rural scenario, or highway scenario. In FIG. 8, e.g., when the UE operates for a certain scenario, one AI/M model may be used when the UE is operating in a first PLMN whit another AI/M model may be used when the UE is operating in a second PLMN. In the depicted example, for Feature1, AI/ML models ID1, ID42 are stored. For Scenario1, AI/ML model ID1 is used when the UE is operating in the first or second PLMN. For Scenario 2, AI/ML model ID42 is used only when the UE is operating in the second PLMN, when operating in the first PLMN no AI/ML model is used. For Feature2, AI/ML model ID5 is stored which is used only for Scenario1 when the UE is operating in the first PLMN, when operating in the second PLMN no AI/ML model is used. For Scenario2, no AI/ML model is used. Thus, a first level of the hierarchical structure includes all AI/ML models for Feature1 and Feature2 (see hierarchy level 1 in FIG. 8), a second level of the hierarchical structure includes all AI/ML models for one of features (see hierarchy level 2 in FIG. 8), a third level of the hierarchical structure includes all AI/ML models for one of the scenarios of a feature (see hierarchy level 3 in FIG. 8), and a fourth level of the hierarchical structure includes all AI/ML models for one of the PLMNs of a scenario of a feature (see hierarchy level 4 in FIG. 8)

The hierarchical structure of AI/ML models, as presented in FIG. 8, comes along with multiple ways of obtaining the above mentioned individual or common identification values, e.g. by means of a hash/checksum. However, multiple individual or common identification values corresponding to the different hierarchy levels may bring an undesired complexity to database operations.

Therefore, in accordance with embodiments, a hierarchical hash identification structure may be used together with the individual or common identification values, simplifying the process of accessing the data base using the identification value to determine a UE capability or supported AI/ML model. For example, each of the identification values for an AI/ML model may be associated with hierarchy level fields so that the AI/ML model is identified by its identification value ID # and an identification of the feature, Feature id, the scenario, Scenario id, and the PLMN, PLMN id, it is provided for. For example, the AI/ML model to be used when the UE is operating in PLMN1 in Scenario1 for implementing Feature1 may be identified by ID1+Feature1+Scenario1+PLMN 1 (identification value+Feature id+Scenario id+PLMN id). The AI/ML model to be used when the UE is operating in PLMN2 in Scenario1 for implementing Feature1 may be identified by ID1+Feature1+Scenario1+PLMN2. The AI/ML model to be used when the UE is operating in PLMN2 in Scenario2 for implementing Feature1 may be identified by ID42+Feature1+Scenario2+PLMN2. The AI/ML model to be used when the UE is operating in PLMN1 in Scenario1 for implementing Feature2 may be identified by ID5+Feature1+Scenario2+PLMN2. Thus, the model id, like ID1, may be globally identified in a hierarchical level.

In general, the process of UE capability reporting, also including the reporting on the AI/ML capabilities, is initiated by the network requesting the UE to inform about its capability by sending the UE capability enquiry message. The UE replies to the UE capability enquiry message by sending the UE capability information including the identification value in accordance with the first aspect of the present invention for reducing the signaling overhead. It is noted that the UE capability enquiry message may ask the UE to provide all its capabilities, however, the present invention is not limited to such embodiments, rather, the enquiry message may not include all possible UE capability information but may restrict the information to a certain type and amount of UE capability information, for example by including respective requirements into the enquiry message. For example, the network may only enquire about the AI/ML models used at the UE, and in response, the UE may return the requested capability information using for the requested capabilities the identification value in accordance with embodiments of the first aspect of the present invention as described above.

In accordance with further embodiments, as mentioned above, also the UE may include or have access to the database for associating an identification value with a certain capability. In accordance with further embodiments, a UE making use of an AI/ML model may take advantage of the inventive approach and receive from the network side or from any other network entity an identification value associated with AI/ML model-related data the UE may identify on the basis of the identification value received, rather than receiving all the data explicitly.

In accordance with embodiments, the UE may receive from the network a request to suspend a certain AI/ML model or remove the same from the UE, or to add or provision one or more new AI/ML models to the UE, which causes the UE to add them to one or more of its feature lists. A respective AI/ML model is identified using the identification value. For example, the UE may be informed that this is to be performed once a validity associated with the AI/ML model expires. Also, using the identification values, the network may indicate an AI/ML model to be used a default model, for example during an initial access of the UE, which may be indicated in the MIB or SIB. The indication can be done using as an identification value one or more of the following:

one or more AI/ML model IDs,
    one or more functionality/feature IDs, like FR2, FR1, unlicensed, CSI, positioning, multi carrier,
    one or more scenario IDs, like rural, urban, high speed train)

Furthermore, the indication may be done hierarchically so that the UE takes a first configuration from a list that it supports.

In another embodiment the indication may include a barring of certain models/functionalities/scenarios that are not allowed to be used. For example, the UE may signal barring information to the wireless communication network or to a further UE, and/or the UE may include within the barring information one or more of:

the one or more identification values of the one or more AI/ML models it has barred,
    a barring time, e.g., how long the model is barred,
    a trigger condition that has to be fulfilled to unbar the AI/ML model.

Second Aspect

Figure 9:
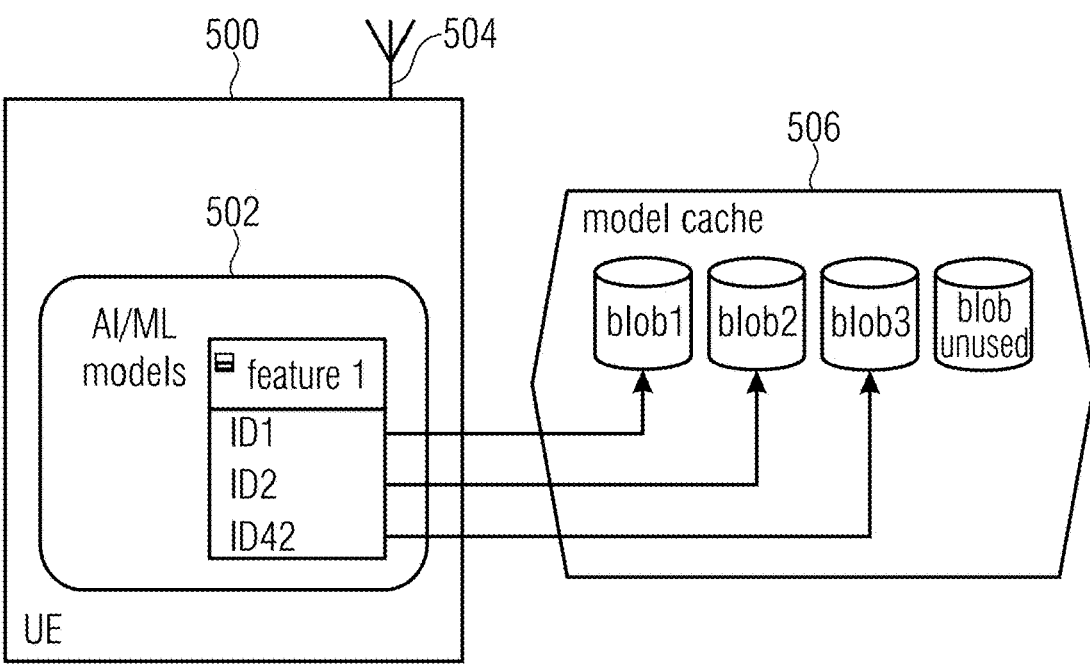
FIG. 9 illustrates embodiments of a second aspect of the present invention.

Embodiments of the second aspect of the present invention are now described. A UE may be configured to store a plurality of AI/ML models for a certain feature, as has also been described above with reference to FIG. 6. This avoid problems in conventional approaches allowing the use of only a single AI/ML model so that, once the currently used AI/ML model may no longer be employed or needs an update, the new AI/ML model needs to be provisioned at the UE which goes together with an increase in signaling overhead. FIG. 9 illustrates an embodiment of a UE 500 including a signal processing unit 502 and one or more antennas or one or more antenna arrays including one or more antennas 504. The signaling process unit 502 is provided for implementing one or more features, like Feature1, which is linked one or more functions to be performed by the UE, e.g., to a physical layer function, like a CSI feedback mechanism or a CSI compression function, or to a positioning function, or to a beam management-related function. Feature1 includes a plurality of AI/ML models or algorithms ID1, ID2 and ID42 for implementing the one or more functions associated with Feature1.

In accordance with embodiments, the AI/ML models may be identified by identification values according to the first aspect of the present invention as described with reference to FIG. 6, FIG. 7 and FIG. 8. In accordance with embodiments, the AI/ML models may be stored using a hierarchical structure as described above with reference to FIG. 8. The UE 500 may access a model cache 506 which may be provided in a local storage in the UE 500 or to which the UE may have access, and the model cache 506 is provided to store the plurality of AI/ML models ID1, ID2 and ID42 as indicted by the lines leading to storage areas indicated by Blob1 to Blob3. Additional storage space for storing a further AU/In the embodiment depicted, there may be additional storage "Blob unused" for storing a further AI/ML model may also be provided.

Thus, in accordance with embodiments of the second aspect, the model cache 506 stores models and/or model parameters.

In accordance with embodiments, additional information may be stored for identifying and/or executing a certain AI/ML model. For example, the additional information may be one or more of:

a validity of the AI/ML model,
    an origin of the AI/ML model,
    a wireless communication network, like a Public Land Mobile Network, PLMN, cell ID, gNB ID, or beam ID to which an identification is linked which is used for identifying an AI/ML model, wherein the identification may be an identification value according to the first aspect of the present invention,
    a UE ID, e.g., in case it has received the AI/ML model from a further UE.

In accordance with embodiments, an AI/ML model is valid when one or more of the following applies:

a predefined time duration has not expired,
    the UE is at a predefined geographical area, like a certain PLMN, a certain cell ID, a certain paging area, a certain zone,
    a hash check indicates a correspondence with a version of the AI/ML model stored on a certain server from which the AI/ML model originates,
    an authorization to use the AI/ML model is given,
    a power consumption and/or a complexity of the AI/ML model is below a predefined threshold,
    a certain use case applies, e.g., the UE is to allow for a communication within a certain frequency range, or at a certain time, or at a certain speed, or within a certain network slice, or with a certain Quality of Service, QoS, compatibility, or with a certain priority, or in a certain scenario, like highway, urban, rural,
    a storage space for the AI/ML modes does not exceed a predefined level.

In accordance with further embodiments, a model ID may not be globally unique. For example, the model cache 506 stores the location from which the model originates, like the original server or core network or PLMN so as to provide for a link to the correct model ID of the model stored. For example, different PLMNs or different AI/ML servers may use the same ID for different models and in such a situation, model ID1 may be present multiple times in the model cache, so that the linking is required on the basis of the currently connected PLMN, gNB or AI/ML server so as to clearly identify the AI/ML model used.

In accordance with other embodiments, the cache 526 may store an unused model for a certain time duration or for an unlimited time, for example to have it as a fallback mechanism. Further, in accordance with embodiments, the AI/ML model may be deleted in case of a certain event. For example, in case the UE requires further storage, or in case the UE moves to a location, or a deletion of the model is signaled by the network or a further UE, or the storage space is needed for a different purpose, e.g. to perform a software update or to store system or program or user data, or the UE starts using an interface which does not support using the AI/ML model, like switching between the Uu interface and the PC5 interface. The unused model, after being deactivated, may be linked or activated again, for example, by using a hash. For example, a model having a duration or validity after which it is invalidated, may still be kept in the cache so that in case the UE asks for a certain model ID again, and in case the hash has not changed the UE finds the model in the cache, and may re-activate it.

Figure 10:
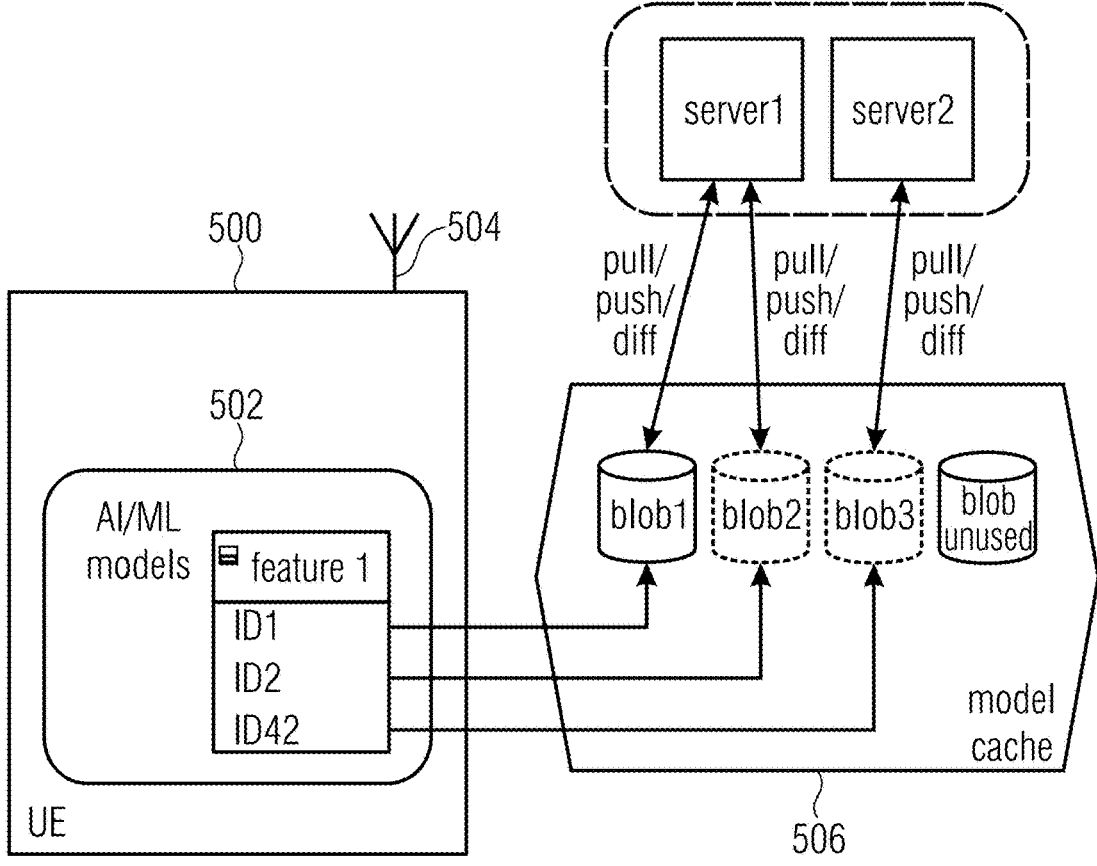
FIG. 10 illustrates updating a model cache according to embodiments of a second aspect of the present invention.

FIG. 10 illustrates an embodiment for updating the model cache. Model updates may happen in various ways, and the model may be updated partly or in full. Furthermore, this may be pulled by the UE or pushed by a server. A UE or gNB or CN may also check for any differences between the currently cached models and the models provided by the server. Also, a validity may be extended or shortened. Further, the validity may be linked to a condition, like a UE moving into a different region or using a different set of resources, like a different resource pool. FIG. 10 illustrates an embodiment in accordance with which the model cache 526 receives for the respective models stored in Blob1 to Blob3 updates from server 1 and server 2 respectively, which may be provided either on request from the UE or automatically by the server.

General

Embodiments of the present invention have been described in detail above, and the respective embodiments and aspects may be implemented individually or two or more of the embodiments or aspects may be implemented in combination.

In accordance with embodiments, the wireless communication system may include a terrestrial network, or a non-terrestrial network, or networks or segments of networks using as a receiver an airborne vehicle or a space-borne vehicle, or a combination thereof. Further, the wireless communication system may by a system or network different from the above described 4G or 5G mobile communication systems, rather, embodiments of the inventive approach may also be implemented in any other wireless communication network, e.g., in a private network, such as an Intranet or any other type of campus networks, or in a WiFi communication system.

In accordance with embodiments of the present invention, a user device comprises one or more of the following: a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and requiring input from a gateway node at periodic intervals, a mobile terminal, or a stationary terminal, or a cellular IoT-UE, or a vehicular UE, or a vehicular group leader (GL) UE, or a sidelink relay, or an IoT or narrowband IoT, NB-IoT, device, or wearable device, like a smartwatch, or a fitness tracker, or smart glasses, or a ground based vehicle, or an aerial vehicle, or a drone, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or a Wi-Fi device, like a station (STA), access point (AP), node or mesh node, or mesh point, or Mesh AP, or any sidelink capable network entity.

In accordance with embodiments of the present invention, a network entity comprises one or more of the following: a macro cell base station, or a small cell base station, or a central unit of a base station, an integrated access and backhaul, IAB, node, or a distributed unit of a base station, or a road side unit (RSU), or a Wi-Fi device such as an access point (AP) or mesh node (Mesh AP), or a remote radio head, or an AMF, or a MME, or a SMF, or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network.

Although some aspects of the described concept have been described in the context of an apparatus, it is clear, that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 11:
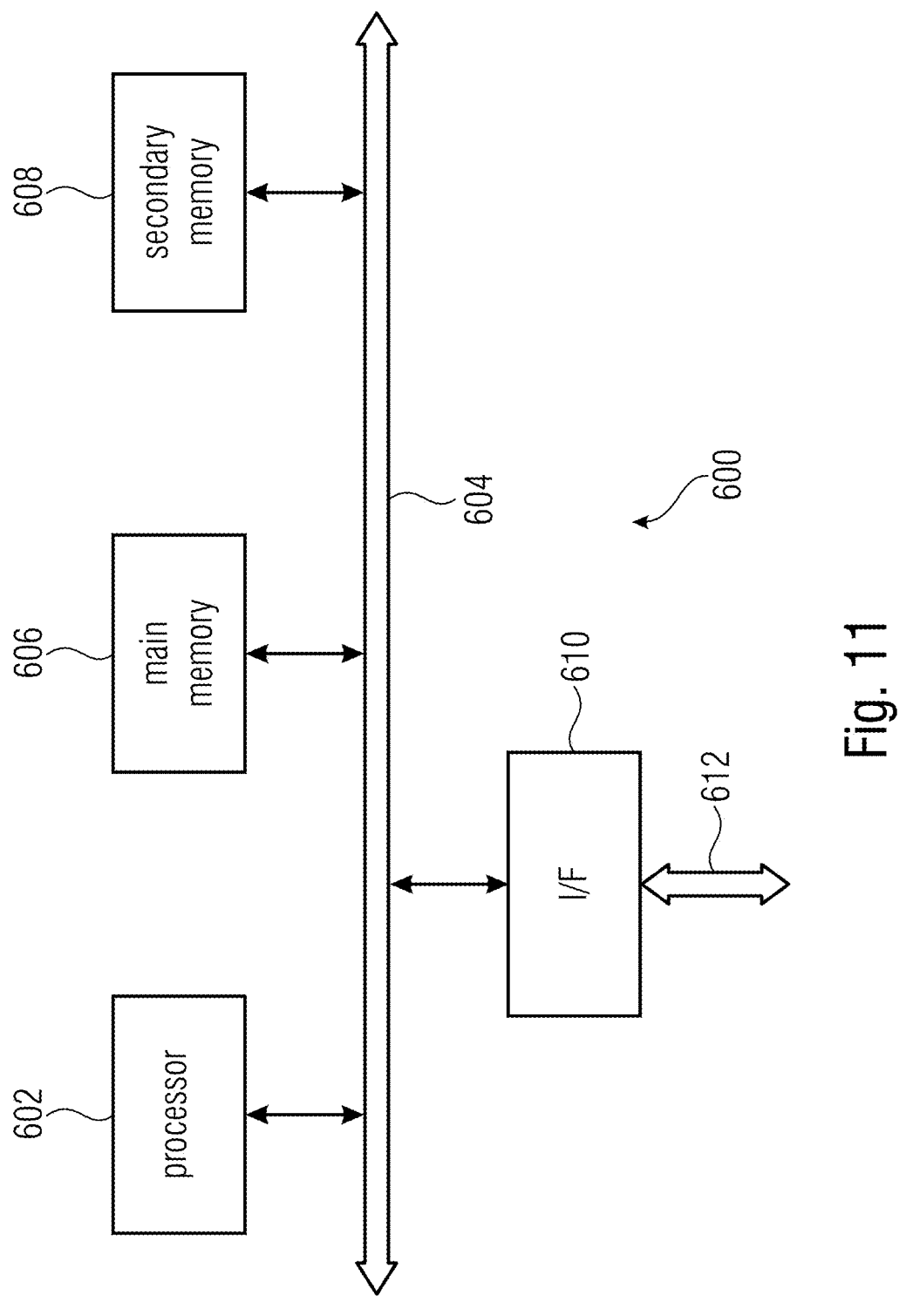
FIG. 11 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 11 illustrates an example of a computer system 600. The units or modules as well as the steps of the methods performed by these units may execute on one or more computer systems 600. The computer system 600 includes one or more processors 602, like a special purpose or a general-purpose digital signal processor. The processor 602 is connected to a communication infrastructure 604, like a bus or a network. The computer system 600 includes a main memory 606, e.g., a random-access memory, RAM, and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier or a digital storage medium, or a computer-readable medium comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device, for example a field programmable gate array, may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A user device, UE, for a wireless communication network, like a $3^{rd}$ Generation Partnership Project, 3GPP, network,
  wherein the UE comprises a plurality of UE capabilities, the UE capabilities indicating functions the UE is capable to perform, and
  wherein the UE is to inform on one or more parts of the plurality of UE capabilities using one or more identification values, e.g., hash values,
  wherein the UE is capable to use one or more artificial intelligence/machine learning, AI/ML, models, and the plurality of UE capabilities comprises information on the one or more AI/ML models,
  wherein the UE is to store additional information for identifying and/or executing a certain AI/ML model, the additional information including a validity of the certain AI/ML model and a cell ID linked to the certain AI/ML model, and
  wherein the validity of an AI/ML model is associated with a signaling of AI/ML model update or capability information, and the validity of the certain AI/ML model is determined when the UE is associated with the cell ID, and/or the certain AI/ML model is valid when the UE is associated with the cell ID.

2. The user device, UE, of claim 1, wherein:
  each of the one or more AI/ML models is identified by an individual identification value, or
  two or more of the AI/ML models are identified by a common identification value.

3. The user device, UE, of claim 1, wherein:
  the UE is to receive a request, like a UE capability enquiry message, from the wireless communication network or from a further UE to report some or all of the AI/ML models supported by the UE, and/or
  responsive to the request, the UE is to send the one or more identification values representing the supported AI/ML models to the wireless communication network or to the further UE.

4. The user device, UE, of claim 3, wherein:
  the UE is to receive from the wireless communication network or from a further UE a request indicating one or more identification values or a common identification value representing AI/ML models, and/or
  responsive to the request, the UE is to:
    deactivate the one or more AI/ML models indicated by the one or more identification values or the common identification value, or
    reset the one or more AI/ML models indicated by the one or more identification values or the common identification value into a predefined state.

5. The user device, UE, of claim 1, wherein:
  the UE is to receive from the wireless communication network or from a further UE one or more additional AI/ML models to be supported by the UE, and/or
  store the one or more additional AI/ML models.

6. The user device, UE, of claim 1, wherein:

the UE is to receive from the wireless communication network or from a further UE a message, like a Master Information Block, MIB, or a System Information Block, SIB, indicating one or more identification values or a common identification value representing AI/ML models, and/or responsive to the message, the UE is to:

use the one or more AI/ML models indicated by the one or more identification values or the common identification value as default AI/ML model, or use among the one or more AI/ML models indicated by the one or more identification values or the common identification value a first AI/ML model supported by the UE as default AI/ML model, or bar the one or more AI/ML models indicated by the one or more identification values or the common identification value from being used by the UE.

7. The user device, UE, of claim 1, wherein the UE is to include within barring information one or more:

the one or more identification values of the one or more AI/ML models it has barred, a barring time, e.g., how long the model is barred, a trigger condition that has to be fulfilled to unbar the AI/ML model.

8. The user device, UE, of claim 7, wherein the UE is to signal the barring information to the wireless communication network or to a further UE.

9. The user device, UE, of claim 1, wherein an AI/ML model is identified by a non-unique identification value used at different origins of the AI/ML model, like different AI/ML servers or different wireless communication networks, and wherein the UE is to link the AI/ML model with the origin of the AI/ML model.

10. The user device, UE, of claim 1, wherein the UE is to associate each of the stored AI/ML models with an identification value, like a hash value, and wherein the UE is to re-activate an AI/ML model after the last use using the identification value.

11. The user device, UE, of claim 1, wherein an AI/ML model is updated partly or in full, and/or the UE is to pull an AI/ML model update, and/or an AI/ML model update is pushed to the UE, and/or an AI/ML model is updated in case a difference is detected between the AI/ML model stored at the UE and the AI/ML model stored at an origin of the AI/ML model, and/or an AI/ML model update comprises an update of one or more validity conditions of the AI/ML model, e.g., a change in the validity time, or a change of a geographical area in which the UE is located, or a use of a different set of resources, like a different resource pool.

12. The user device, UE, of claim 1, wherein:

each AI/ML model is identified by an individual identification value, or two or more of the AI/ML models are identified by a common identification value.

13. The user device, UE, of claim 1, wherein each of the AI/ML models is identified by the individual identification value, e.g., an individual hash value, and the common identification value identifying two or more of the AI/ML models is acquired using the individual identification values, e.g., by hashing the individual hash values.

14. The user device, UE, of claim 1, wherein:

the UE is to store the AI/ML models using a hierarchical structure defining a plurality of hierarchy levels, e.g., for defining for each feature, a certain scenario and a certain PLMN, and/or an AI/ML model is identified using the identification value of the AI/ML model and the hierarchy level at which the AI/ML model is stored.

15. A network entity for a wireless communication network, like a $3^{rd}$ Generation Partnership Project, 3GPP, network, wherein the network entity is to receive from a user device, UE, information on the UE capabilities, the UE capabilities indicating functions the UE is capable to perform, wherein the information comprises one or more identification values, like hash values, identifying one or more parts of the plurality of UE capabilities, and wherein the network entity is to determine UE capabilities using the received one or more identification values, wherein the UE is capable to use one or more artificial intelligence/machine learning, AI/ML, models, and the plurality of UE capabilities comprises information on the one or more AI/ML models, wherein the UE is to store additional information for identifying and/or executing a certain AI/ML model, the additional information including a validity of the certain AI/ML model and a cell ID linked to the certain AI/ML model, and wherein the validity of an AI/ML model is associated with a signaling of AI/ML model update or capability information, and the validity of the certain AI/ML model is determined when the UE is associated with the cell ID, and/or the certain AI/ML model is valid when the UE is associated with the cell ID.

16. A method for operating a network entity for a wireless communication network, like a $3^{rd}$ Generation Partnership Project, 3GPP, network, the method comprising:

receiving from a user device, UE, information on the UE capabilities, the UE capabilities indicating functions the UE is capable to perform, wherein the information comprises one or more identification values, like hash values, identifying one or more parts of the plurality of UE capabilities, and determining UE capabilities using the received one or more identification values, wherein the UE is capable to use one or more artificial intelligence/machine learning, AI/ML, models, and the plurality of UE capabilities comprises information on the one or more AI/ML models, wherein the UE stores additional information for identifying and/or executing a certain AI/ML model, the additional information including a validity of the certain AI/ML model and a cell ID linked to the certain AI/ML model, and wherein the validity of an AI/ML model is associated with a signaling of AI/ML model update or capability information, and the validity of the certain AI/ML model is determined when the UE is associated with the cell ID, and/or the certain AI/ML model is valid when the UE is associated with the cell ID.

* * * * *